US012498729B2

(12) United States Patent
Sridhar et al.

(10) Patent No.: US 12,498,729 B2
(45) Date of Patent: *Dec. 16, 2025

(54) ROAD SURFACE-BASED VEHICLE CONTROL

(71) Applicant: ClearMotion, Inc., Billerica, MA (US)

(72) Inventors: Vijayaraghavan Sridhar, New York, NY (US); John Parker Eisenmann, Burlington, MA (US); Yu Jiang, Wellesley, MA (US); David Francis Weatherwax, Westford, MA (US)

(73) Assignee: ClearMotion, Inc., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,943

(22) Filed: Jun. 30, 2023

(65) Prior Publication Data
US 2024/0103531 A1  Mar. 28, 2024

Related U.S. Application Data

(63) Continuation of application No. 17/009,243, filed on Sep. 1, 2020, now Pat. No. 11,733,707, which is a
(Continued)

(51) Int. Cl.
*G05D 1/00* (2024.01)
*B60W 40/06* (2012.01)
(Continued)

(52) U.S. Cl.
CPC .......... *G05D 1/0278* (2013.01); *B60W 40/06* (2013.01); *G01C 21/30* (2013.01); *G05D 1/0231* (2013.01);
(Continued)

(58) Field of Classification Search
CPC ...... G05D 1/02; G05D 1/0231; G05D 1/0278; B60W 40/06; B60W 2050/046;
(Continued)

(56) References Cited

U.S. PATENT DOCUMENTS

| 8,589,063 | B2 | 11/2013 | Trum |
| 8,996,234 | B1 | 3/2015 | Tamari |

(Continued)

FOREIGN PATENT DOCUMENTS

| DE | 102008032545 A1 | 1/2010 |
| DE | 102014223475 A1 | 5/2016 |

(Continued)

OTHER PUBLICATIONS

U.S. Appl. No. 16/130,311, filed Sep. 13, 2018, Sridhar et al.
(Continued)

*Primary Examiner* — Atul Trivedi

(57) ABSTRACT

Systems and methods for determining the location of a vehicle are disclosed. In one embodiment, a method for localizing a vehicle includes driving over a first road segment, identifying by a first localization system a set of candidate road segments, obtaining vertical motion data while driving over the first road segment, comparing the obtained vertical motion data to reference vertical motion data associated with at least one candidate road segment, and identifying, based on the comparison, a location of the vehicle. The use of such localization methods and systems in coordination with various advanced vehicle systems such as, for example, active suspension systems or autonomous driving features, is contemplated.

8 Claims, 9 Drawing Sheets

Related U.S. Application Data continuation of application No. 16/130,311, filed on Sep. 13, 2018, now Pat. No. 10,901,432.

(60) Provisional application No. 62/558,295, filed on Sep. 13, 2017.

(51) Int. Cl.
*B60W 50/04* (2006.01)
*G01C 21/30* (2006.01)

(52) U.S. Cl.
CPC . *B60W 2050/046* (2013.01); *B60W 2420/403* (2013.01); *B60W 2420/408* (2024.01); *B60W 2420/503* (2013.01); *B60W 2552/35* (2020.02); *B60W 2554/00* (2020.02)

(58) Field of Classification Search
CPC ..... B60W 2420/403; B60W 2420/408; B60W 2420/503; B60W 2552/35; B60W 2554/00; G01C 21/30
USPC .......................................................... 701/26
See application file for complete search history.

(56) References Cited

U.S. PATENT DOCUMENTS

| | | | |
|---|---|---|---|
| 9,554,241 B2* | 1/2017 | Foster | G01S 5/0072 |
| 10,486,485 B1 | 11/2019 | Levinson et al. | |
| 10,901,432 B2 | 1/2021 | Sridhar et al. | |
| 10,953,887 B2 | 3/2021 | Magnusson et al. | |
| 11,733,707 B2 | 8/2023 | Sridhar et al. | |
| 2005/0236896 A1 | 10/2005 | Offerle et al. | |
| 2005/0288842 A1 | 12/2005 | Brewer et al. | |
| 2007/0067085 A1 | 3/2007 | Lu et al. | |
| 2007/0156320 A1 | 7/2007 | Breed | |
| 2007/0255510 A1 | 11/2007 | Mancosu | |
| 2008/0215231 A1 | 9/2008 | Breed | |
| 2008/0243327 A1 | 10/2008 | Bujak et al. | |
| 2008/0243334 A1 | 10/2008 | Bujak et al. | |
| 2008/0243335 A1 | 10/2008 | Rao et al. | |
| 2010/0280751 A1 | 11/2010 | Breed | |
| 2013/0096731 A1* | 4/2013 | Tamari | G06F 11/3058 |
| | | | 701/1 |
| 2013/0231825 A1 | 9/2013 | Chundrlik, Jr. | |
| 2014/0067240 A1 | 3/2014 | Yu | |
| 2014/0195112 A1 | 7/2014 | Lu et al. | |
| 2014/0297116 A1 | 10/2014 | Anderson et al. | |
| 2015/0054639 A1* | 2/2015 | Rosen | H04W 4/80 |
| | | | 340/439 |
| 2015/0143913 A1 | 5/2015 | Adams et al. | |
| 2015/0290995 A1 | 10/2015 | Kanda et al. | |
| 2016/0202078 A1* | 7/2016 | Scalisi | B60K 35/28 |
| | | | 701/519 |
| 2016/0253566 A1 | 9/2016 | Stein et al. | |
| 2016/0311442 A1* | 10/2016 | Shin | B60W 30/18145 |
| 2017/0030716 A1* | 2/2017 | Ali | G06V 40/10 |
| 2017/0052028 A1* | 2/2017 | Choudhury | G01C 21/165 |
| 2017/0064515 A1* | 3/2017 | Heikkila | G01S 5/02522 |
| 2017/0227970 A1 | 8/2017 | Taguchi | |
| 2017/0270372 A1 | 9/2017 | Stein | |
| 2017/0300056 A1 | 10/2017 | Johnson | |
| 2017/0349148 A1 | 12/2017 | Bojanowski | |
| 2018/0015801 A1 | 1/2018 | Mohamed et al. | |
| 2018/0025235 A1 | 1/2018 | Fridman | |
| 2018/0079272 A1 | 3/2018 | Aikin | |
| 2018/0218596 A1 | 8/2018 | Castelli | |
| 2019/0023094 A1 | 1/2019 | Panagis et al. | |
| 2019/0038938 A1 | 2/2019 | Nagasaka | |
| 2019/0079539 A1 | 3/2019 | Sridhar | |
| 2019/0137275 A1 | 5/2019 | Choudhury et al. | |
| 2019/0329786 A1 | 10/2019 | Kimura | |
| 2020/0079381 A1 | 3/2020 | Lombrozo et al. | |
| 2020/0117199 A1 | 4/2020 | Akella et al. | |
| 2020/0139784 A1 | 5/2020 | Sridhar et al. | |
| 2020/0139967 A1 | 5/2020 | Beller et al. | |
| 2020/0211394 A1 | 7/2020 | King et al. | |
| 2021/0001861 A1 | 1/2021 | Lobey | |
| 2021/0055740 A1 | 2/2021 | Sridhar et al. | |
| 2021/0173055 A1 | 6/2021 | Jian et al. | |
| 2021/0229656 A1 | 7/2021 | Dax | |
| 2021/0331549 A1 | 10/2021 | Furuta | |
| 2021/0379955 A1 | 12/2021 | Furuta | |
| 2021/0394573 A1 | 12/2021 | Vente et al. | |
| 2022/0009501 A1* | 1/2022 | Guan | B60W 40/06 |
| 2022/0082705 A1 | 3/2022 | Graves et al. | |
| 2022/0189302 A1 | 6/2022 | Jiang et al. | |
| 2022/0196849 A1 | 6/2022 | Chen et al. | |
| 2022/0212678 A1 | 7/2022 | Eisenmann et al. | |
| 2022/0281456 A1 | 9/2022 | Giovanardi et al. | |
| 2022/0324421 A1 | 10/2022 | Giovanardi et al. | |
| 2022/0379679 A1 | 12/2022 | Eisenmann et al. | |
| 2022/0390239 A1 | 12/2022 | Eisenmann et al. | |
| 2023/0017774 A1 | 1/2023 | Giovanardi et al. | |
| 2023/0100524 A1 | 3/2023 | Ikeda et al. | |
| 2024/0010190 A1* | 1/2024 | Naes | B60W 30/18 |
| 2024/0159558 A1* | 5/2024 | Ivanov | G01C 21/3848 |

FOREIGN PATENT DOCUMENTS

| | | |
|---|---|---|
| DE | 112020001131 T5 | 1/2022 |
| EP | 3 088 845 A1 | 11/2016 |
| EP | 3 878 255 A1 | 9/2021 |
| EP | 3 878 256 A1 | 9/2021 |
| EP | 3 878 257 A1 | 9/2021 |
| EP | 3 878 258 A1 | 9/2021 |
| JP | 2009-156746 A | 7/2009 |
| JP | 2015-028456 A | 2/2015 |
| JP | 6021309 B2 | 11/2016 |
| WO | WO 2006/126367 A1 | 11/2006 |
| WO | WO 2012/019691 A1 | 2/2012 |
| WO | WO 2014/145018 A2 | 9/2014 |
| WO | WO 2015/153811 A1 | 10/2015 |
| WO | WO 2015/162528 A1 | 10/2015 |
| WO | WO 2016/197068 A1 | 12/2016 |
| WO | WO 2018/167215 A1 | 9/2018 |
| WO | WO 2019/049080 A2 | 3/2019 |
| WO | WO 2021/231837 A2 | 11/2021 |

OTHER PUBLICATIONS

U.S. Appl. No. 16/672,004, filed Nov. 1, 2019, Sridhar et al.
U.S. Appl. No. 17/009,243, filed Sep. 1, 2020, Sridhar et al.
U.S. Appl. No. 17/285,174, filed Apr. 14, 2021, Vente et al.
U.S. Appl. No. 17/436,012, filed Sep. 2, 2021, Jiang et al.
U.S. Appl. No. 17/477,147, filed Sep. 16, 2021, Graves et al.
U.S. Appl. No. 17/489,924, filed Sep. 30, 2021, Chen et al.
U.S. Appl. No. 17/511,331, filed Oct. 26, 2021, Eisenmann et al.
U.S. Appl. No. 17/560,794, filed Dec. 23, 2021, Giovanardi et al.
U.S. Appl. No. 17/560,825, filed Dec. 23, 2021, Giovanardi et al.
U.S. Appl. No. 17/772,036, filed Apr. 26, 2022, Eisenmann et al.
U.S. Appl. No. 17/773,676, filed May 2, 2022, Eisenmann et al.
U.S. Appl. No. 17/787,679, filed Jun. 21, 2022, Giovanardi et al.
U.S. Appl. No. 17/920,628, filed Oct. 21, 2022, Giovanardi et al.
U.S. Appl. No. 18/343,130, filed Jun. 28, 2023, Vente et al.

* cited by examiner

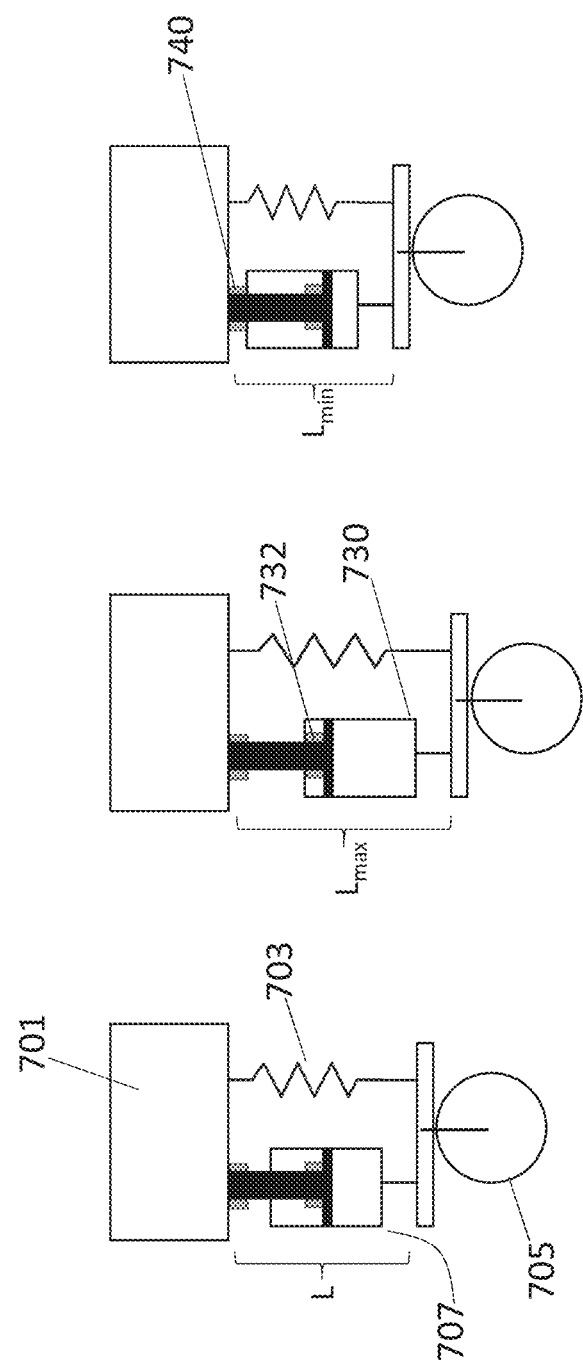

ROAD SURFACE-BASED VEHICLE CONTROL

RELATED APPLICATIONS

This application is a continuation of U.S. application Ser. No. 17/009,243, filed Sep. 1, 2020, which is a continuation of U.S. application Ser. No. 16/130,311, filed Sep. 13, 2018, which claims the benefit under 35 U.S.C. § 119(e) of U.S. provisional application Ser. No. 62/558,295, filed Sep. 13, 2017, the disclosures of each of which are incorporated herein by reference in their entirety.

BACKGROUND

Advanced vehicle systems, such as, for example, active suspension systems or autonomous or semi-autonomous driving systems, may rely on highly accurate localization of a vehicle. Current commercially available localization systems, such as, for example, localization based on global positioning systems (GPS), may not provide sufficient accuracy or resolution.

SUMMARY

Disclosed herein, inter alia, are various methods and systems for determining the location of a vehicle. It is envisioned that such methods may be utilized to accurately and/or precisely determine a vehicle's location to a high resolution. The use of such methods and systems in coordination with various advanced vehicle systems such as, for example, active suspension systems or autonomous driving features, is contemplated.

In one aspect, a method of localizing a vehicle is disclosed that comprises: (a) driving over a first road segment; (b) identifying, by a first localization system (e.g., GPS), a set of candidate road segments; (c) sensing (e.g., by one or more (e.g., by one, two, four) accelerometers) a sequence of vertical motion of one or more (e.g., at least one, at least two, at least three, at least four, more than four) wheels of the vehicle to obtain vertical motion data while driving over the first road segment; (d) accessing at least one computer memory storing reference vertical motion data for at least one candidate road segment of the set of candidate road segments; (e) comparing the vertical motion data obtained while driving over the first road segment to the stored reference vertical motion data for the at least one candidate road segment; and (f) based at least partially on the comparison, determining a location of the vehicle. In certain embodiments, determining the location of the vehicle comprises identifying, based on the comparison, a first candidate road segment (e.g., a "best-match" road segment) from the set of candidate road segments. In certain embodiments, the reference vertical motion data of the first candidate road segment may substantially match the vertical motion data obtained while driving over the first road segment. In certain embodiments, acceleration of at least two wheels of the vehicle may be sensed as the vehicle traverses a portion of the first road segment. In certain embodiments, the location of the vehicle may be determined based at least partially on a wheel base of the vehicle and/or an axle track of the vehicle.

In certain embodiments, determining the location of the vehicle comprises: determining a plurality of correlation values, wherein each correlation value represents a degree of correlation between the vertical motion data obtained while driving over the first road segment to the stored reference vertical motion data for a different road segment of the set of candidate road segments; determining the highest correlation value of the plurality of correlation values; and identifying a first road segment from the set of candidate road segments, wherein the first road segment is associated with the highest correlation value;

In certain embodiments, the operating speed of the vehicle may be detected (e.g., using a speedometer), and the location of the vehicle may be determined based at least partially on the operating speed of the vehicle. In certain embodiments, obtaining vertical motion data comprises transforming, based at least in part on the detected operating speed of the vehicle, the sequence of sensed vertical motion (e.g., acceleration) from a time domain to a space domain.

In certain embodiments, obtaining vertical motion data comprises: sensing a sequence of vertical accelerations of each of the one or more (e.g., one, two, four) wheels as a function of time; doubly integrating the sequence of vertical accelerations with respect to time to obtain a sequence of vertical positions with respect to time; transforming the sequence of vertical positions from a time domain to a space domain to obtain a transformed sequence of vertical positions; doubly differentiating the transformed sequence of vertical positions with respect to space to obtain the vertical motion data (e.g., such that the vertical motion data corresponds to a sequence of vertical accelerations of each of the one or more wheels as a function of space). In certain embodiments, the reference vertical motion data comprises a reference sequence of vertical accelerations as a function of space (e.g., vertical accelerations in the space domain). In certain embodiments, following transformation of the sequence of vertical positions from the time domain to the space domain to obtain a transformed sequence of vertical positions, applying a low pass filter to the transformed sequence of vertical positions. The cut-off frequency used for the low pass filter, in certain embodiments, is not greater than a first threshold (e.g., wherein the first threshold is 1 cycle/meter, 0.5 cycles/meter, 0.1 cycles/meter).

In certain embodiments, obtaining the vertical motion data comprises: sensing a first sequence of vertical motion of a first set of one or more wheels (e.g., a front wheel, two front wheels); sensing a second sequence of vertical motion of a second set of one or more wheels (e.g., a rear wheel, two rear wheels); determining, based on the first sequence of vertical motion and the second sequence of vertical motion, a sequence of road pitches; wherein the vertical motion data is representative of the sequence of road pitches.

In another aspect, a method for localizing a vehicle using a mobile computing device is disclosed. The method may comprise: (a) determining, by a first localization system of a mobile computing device (e.g., a cell phone, a tablet, a laptop), a first location of a vehicle, wherein the mobile computing device is removably mounted within a vehicle, and wherein the mobile computing device includes the first localization system (e.g. a GPS), and one or more motion sensors; (b) identifying, based on the first location, a candidate set of road segments; (c) during operation of the vehicle, sensing, via the one or more motion sensors (e.g., an IMU, an accelerometer), sequences of motion of the mobile computing device to obtain vertical motion data; (d) accessing at least one computer memory storing reference vertical motion data (e.g., a reference road profile) for a plurality of road segments; (e) comparing the obtained vertical motion data to the stored reference vertical motion data; (f) based at least partially on the comparison, identifying a specific road segment of the candidate set of road segments. In certain embodiments, the specific road segment that is identified may be the road segment of the candidate set of road segments that is associated with reference vertical motion data that most strongly correlates to the vertical motion data obtained during operation of the vehicle.

In another aspect, a method for determining a location of a vehicle is disclosed. The method may comprise: (a) determining, using a first localization system, a first location of a vehicle; (b) determining, using a second localization system, a second location of the vehicle; (c) determining a first weight to assign the first location and a second weight to assign to the second location; (d) based on the first weight and the second weight, determining a weighted average of the first location and the second location. In certain embodiments, the first weight and second weight are dynamically determined based at least in part on an operating condition (e.g., an operating speed) of the vehicle and/or an environmental parameter (e.g., a level of visibility, temperature, precipitation level, a presence of snow or water on the road, etc.). In certain embodiments, the first localization system collects samples at a first sampling rate and the second localization system collects samples at a second sampling rate greater than the first sampling rate, and wherein: when an operating speed of the vehicle is below a threshold speed, the first weight is greater than the second rate; and when the operating speed of the vehicle exceeds the threshold speed, the second weight is greater than the first weight. In another aspect, an apparatus is disclosed comprising a first localization system, a second localization system, and a localization controller in communication with the first and second localization system, wherein the localization controller is configured to determine a first weight to assign to a first location that is determined by the first localization system, determine a second weight to assign to a second location that is determined by the second localization system; and based on the first weight and the second weight, determine a weighted average of the first location and the second location.

In another aspect, a method for locating a vehicle is disclosed that comprises: determining the first location of a first vehicle; communicating the first location to a second vehicle; determining a relative distance between, or relative position of, the second vehicle with respect to the first vehicle; determining, based on the first location and at least one of the relative distance and relative position, a second location of the second vehicle.

In yet another aspect, a method of controlling an active suspension system or component thereof (e.g., an actuator) is disclosed. In certain embodiments, the method comprises: detecting an occurrence of a first end-stop event or near end-stop event in a first vehicle; recording a location of the first vehicle that corresponds to occurrence of the end-stop event or near end-stop event and storing the location in a non-transitory computer memory; accessing, by a second vehicle, the computer memory; determining that the second vehicle will traverse the recorded location; adjusting a current length of an actuator of an active suspension system of the second vehicle prior to the second vehicle reaching the recorded location. The first vehicle may be the same vehicle as the second vehicle, or it may be a different vehicle from the second vehicle. In certain embodiments, the current length of the actuator may be adjusted such that, when one or more wheels of the second vehicle traverses the recorded location of the end-stop event or near-end stop event, the second vehicle does not experience an end-stop event. That is, in certain embodiments, the current length of the actuator of the active suspension system of the second vehicle may be decreased such that, after the decrease, an available extension of the actuator of the active suspension system of the second vehicle exceeds a dimension (e.g., a, a depth) of an obstacle (e.g., a pothole) located at the recorded location. Alternatively, the method may comprise increasing the current length of the actuator of the active suspension system of the second vehicle such that, after the increase, an available compression of the actuator of the active suspension system of the second vehicle exceeds a dimension (e.g., a height) of an obstacle (e.g., a bump, an object) located at the recorded location.

In yet another aspect, a method of controlling an active suspension system or component thereof (e.g., an actuator) is disclosed, comprising: (a) detecting (e.g., by a forward looking sensor communicating with a controller) an obstacle (e.g., an extrusion (e.g., a bump), a depression (e.g., a pothole), a foreign object) in a path of a wheel of a vehicle; (b) determining (e.g., predicting)(e.g., by the controller) a dimension (e.g. a height, a depth) of the obstacle; (c) comparing (e.g., by the controller) the dimension of the obstacle to an available compression or an available extension of an actuator of an active suspension system of the vehicle; (d) upon determining that the dimension of the object exceeds the available compression or the available extension, adjusting a length of the actuator prior to encountering the obstacle. In certain embodiments, (a) comprises detecting an extrusion (e.g., a bump, a foreign object) in the path of the wheel of the vehicle; (b) comprises determining a height of the extrusion; (c) comprises comparing the height of the extrusion to the available compression; and (d) comprises increasing the current length of the actuator. In certain embodiments, (d) comprises increasing the current length of the actuator such that, after the increase, the available compression is not less than the height of the extrusion. In certain embodiments, (a) comprises detecting a depression (e.g., a pothole) in the path of the wheel of the vehicle; (b) comprises determining a depth of the depression; (c) comprises comparing the depth of the depression to the available extension; and (d) comprises decreasing the current length of the actuator. In certain embodiments, (d) comprises decreasing the current length of the actuator such that, after the decrease, the available extension is not less than the depth of the depression. In any of the aforementioned embodiments, (d) may occur before a wheel of the vehicle encounters the obstacle. Also disclosed is a system for carrying out the aforementioned methods, the system comprising a forward looking sensor, an active suspension system that includes an actuator, and a controller in communication with the forward looking sensor and the actuator, wherein the system is configured to carry out the disclosed methods. The forward looking sensor may be, for example, a LIDAR sensor, a RADAR sensor, or a camera.

In certain embodiments, a method for controlling an active suspension system or component thereof (e.g., an actuator) is disclosed, the method comprising: (a) accessing (e.g., by a controller) a three-dimensional map defining locations of one or more obstacles (e.g., depressions (e.g., potholes), extrusions (e.g., bumps, obstacles)) on a road surface and a dimension of each of the one or more obstacles; (b) determining that the vehicle will traverse a first obstacle of the one or more obstacles; (c) comparing (e.g., by the controller) the dimension of the first obstacle to an available compression or an available extension of an actuator of an active suspension system of the vehicle; (d) upon determining that the dimension of the object exceeds the available compression or the available extension, adjusting a current length of the actuator. In certain embodiments, (b) comprises: receiving (e.g., from a user (e.g., an occupant, an operator)) a destination; planning a route from a first location to the destination; based on the locations of the one or more obstacles stored in the three-dimensional map, determining that a first location of the first obstacle overlaps with (e.g., is located along) the planned route.

BRIEF DESCRIPTION OF DRAWINGS

FIG. 7 illustrates an active suspension system actuator at its neutral position.

FIG. 8 illustrates an active suspension system actuator at its maximum length position FIG. 9 illustrates an active suspension system actuator at its minimum length position

Drawings are not to scale unless specifically noted.

DETAILED DESCRIPTION

A variety of vehicle functions including, for example, autonomous or semi-autonomous driving features, rely on systems and methods capable of accurate, high resolution (e.g. in some embodiments equal to sub 1-meter resolution), and repeatable localization of the vehicle beyond that which current commercial localization systems may provide. As an example, conventional GPS-based localization systems generally do not provide sufficient resolution for use in autonomous vehicles. Further, such GPS-based localizations are especially prone to error or failure in situations where (a) signal transmission may be partially blocked due to, for example, tunnels, surrounding buildings, tree cover, mountains, etc. and/or (b) several possible tracks have overlapping coordinates (e.g., as in the case of an elevated highway running over a surface street, GPS may be unable to distinguish whether the vehicle is located on the elevated highway or the surface street underneath).

In light of the above, the inventors have recognized that various environmental characteristics, including surface characteristics of a road or other terrain (e.g., elevation changes, slopes, banks, locations of surface extrusions such as, e.g., bumps and/or depressions, and other surface details) may be utilized for localization, e.g., to identify a location of a vehicle (e.g., a vehicle's position on a road), much like a fingerprint or facial features may be used to identify a person. Such surface-based localization may include, in some implementations, detecting a sequence of surface characteristics of a road surface traversed by a vehicle, followed by matching of the detected sequence to a sequence of reference surface characteristics that is stored in a previously generated reference map. Surface-based localization may offer several advantages, especially when combined with other localization systems (e.g., GPS). First, road surface characteristics are likely to remain unchanged for prolonged periods of time. Second, unlike, for example, visual landmark identification (which may become increasingly difficult under low-light or other low-visibility conditions (e.g., due to rain, snow, time of day, etc.)), the detection of surface characteristics is likely to be unaffected by low-light or low-visibility conditions.

Figure 1:
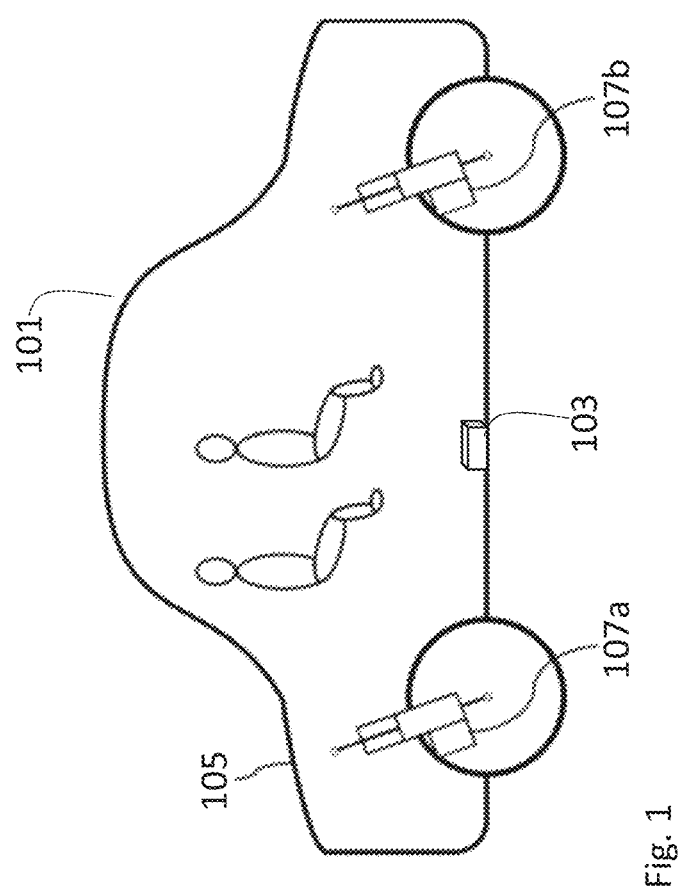
FIG. 1 illustrates an embodiment of a vehicle having a terrain-based localization system.

Turning now to the figures, several non-limiting embodiments are now described in detail. FIG. 1 depicts an embodiment of a vehicle including a localization system that utilizes a motion sensor mounted within the vehicle body. In the illustrated embodiment, surface characteristics of a road surface or terrain on which a vehicle 101 travels may be collected using a motion sensor 103 mounted somewhere within or on the vehicle's body 105. In certain embodiments, the motion sensor 103 may include, for example, one or more IMUs, accelerometers, gyroscopes, and/or magnetometers. In various embodiments, the motion sensor may be configured to detect motion (e.g., acceleration, tilt angle) along one, two, or three axes. In an exemplary use case, a reference map may be generated by traversing a known section of road in a given vehicle and recording a reference sequence of detected vertical motion (e.g., pitch, roll, heave) of the vehicle body 105 as a function of location along the known section of road. The reference map may be stored in memory located on the vehicle 105 itself, or it may be stored on the cloud (e.g., a remotely located memory that is accessible by the vehicle). When the given vehicle, or a different vehicle, subsequently traverses the same section of road while detecting sequences of body motion, the detected sequences can be compared with the reference sequence contained in the reference map in order to locate the vehicle. Sequences of pitch, roll and/or heave of the vehicle body 105 as detected by the motion sensor 103 may be used for localization. Alternatively or additionally, sequences of change in pitch (e.g., sequences of pitch velocity), change in roll (e.g., sequences of roll velocity), and/or change in heave (e.g., sequences of have velocity) may also be used for localization. Alternatively or additionally sequences of pitch acceleration, roll acceleration, and/or heave acceleration may be used to locate the vehicle.

Advantageously, a motion sensor within the vehicle body 105 can be utilized as a direct measure of pitch, roll, and/or heave of the vehicle body without requiring substantial mathematical transformations. However, use of a motion sensor in the vehicle body may have several drawbacks. Namely, a motion sensor mounted within or on the vehicle body 105 measures response of the vehicle body 105 to variations in a road surface, rather than measuring the variations of the road surface directly. As the vehicle 105 may include one or more suspension elements 107a-b (e.g., springs, dampers, actuators, etc.) interposed between each of the wheels and the vehicle body 105, motion of the body 105 may be at least partially decoupled from road surface characteristics. For example, an incline in a road surface may cause a vehicle body 105 to pitch upwards as the vehicle traverses the incline. A body mounted IMU will detect the degree of the pitch of the body 105, and not the degree of the incline of the road. While, at least for passive suspensions, the degree of the pitch of the body is related to the degree of the incline of the road, it may also depend on unknown or unmodeled dynamical or static uncertainties. Further, vehicle-specific factors such as suspension parameters (e.g., spring stiffness, damping coefficients), weight of the sprung mass, etc. may significantly affect vertical motion of the vehicle body. Therefore, a reference map generated using body motion collected with one vehicle traversing a road segment may not represent an accurate description of body motion expected for a second vehicle traversing the same road segment—that is, different vehicles traversing the same road segment or the same vehicle travelling the same road at different speeds may produce different body motion. Additionally, maneuvers such as braking may introduce vertical motion into the vehicle body (e.g., body pitch) that is unrelated to the road surface. Localization based on vehicle body motion must therefore filter out vertical body motion resulting from vehicle maneuvers (e.g., turning, braking, forward acceleration) as opposed to vertical body motion that is due to changes in a road surface. Further, active suspension systems may be used to substantially alter body motion of a vehicle, and in some cases may partially or even completely decouple vertical body motion from certain details of surface characteristics, rendering surface-based localization based of data collected from such vehicles problematic.

Figure 2:
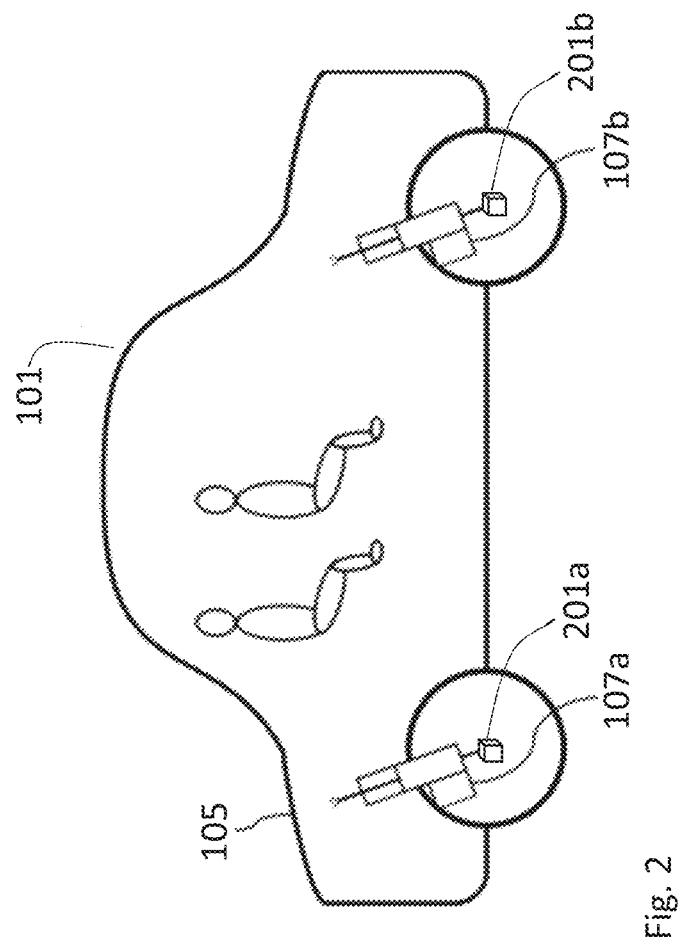
FIG. 2 illustrates an alternative embodiment of a vehicle having a terrain-based localization system.

In considering the above, inventors have recognized that tracking vertical motion of one or more of a vehicle's wheels, rather than the vehicle body, may be more representative of the details of the road surface and better suited for surface-based localization. FIG. 2 depicts an embodiment of a vehicle including a localization system that utilizes wheel motion to determine a location of the vehicle. In the embodiment of FIG. 2, one or more motion sensors 107a-b are arranged to directly detect motion of a wheel of the vehicle 105. For example, a motion sensor 107a may be mounted directly onto a wheel (e.g., a wheel hub) or wheel axle of a vehicle. In certain embodiments, each wheel of the vehicle may have a distinct motion sensor configured to detect motion of that specific wheel (that is, a vehicle with four wheels may have four separate motion sensors). In other embodiments, a single motion sensor may be arranged (for example, on the wheel axle), such that it is capable of determining relative motion of two or more wheels. In various embodiments, the motion sensors may include one or more IMUs, accelerometers, gyroscopes, and/or magnetometers, and may be configured to detect motion in one, two, or three directions.

Unlike the body 105 of a suspended vehicle, vertical motion of a vehicle's wheels is typically constrained to closely follow vertical deflections (e.g., depressions, extrusions) of the road surface. Even if, for example, a suspension system 107a-b is utilized to fully or partially decouple vertical motion of the vehicle body from variations in a surface being traversed by the vehicle, the vertical motion of the vehicle's wheels will nevertheless react to the variations in the road surface, even if the vehicle body does not. Furthermore, a wheel's vertical motion may be less dependent than body motion on vehicle specific factors such as, for example, the aforementioned suspension parameters. Therefore, in certain embodiments, surface information may be inferred using one or more motion sensors attached to a wheel or wheel assembly of a vehicle. The one or more motion sensors may be configured to sense sequences of vertical motion (e.g., acceleration, velocity, and/or a change in vertical position) of one or more wheels of a vehicle. In certain embodiments, a vehicle may comprise a plurality of wheels and a plurality of motion sensors, such that each of the plurality of motion sensors senses vertical motion of one of the wheels.

In certain embodiments, a motion sensor that includes an accelerometer may be used to detect, for example, a sequence of vertical accelerations with respect to time of a wheel of a vehicle. In certain embodiments, the vertical motion data may be collected at a sampling rate of at least, for example, 125 Hz. Since the sensed sequences of vertical motion are in the time domain, such sequences may depend on the specific operating conditions (e.g., operating speed) of the vehicle. In certain embodiments, it may therefore be useful to transform the collected sequences of vertical motion from the time domain to the frequency domain and/or the space domain (e.g., from acceleration or position with respect to time to acceleration or position with respect to space or distance) since, least in theory, sequences of vertical motion with respect to space or frequency may be invariant and only road dependent. By removing dependence on operating speed of the vehicle, a reference map collected using a first operating speed may be used to locate a vehicle having a second operating speed different from the first operating speed.

Figure 3:
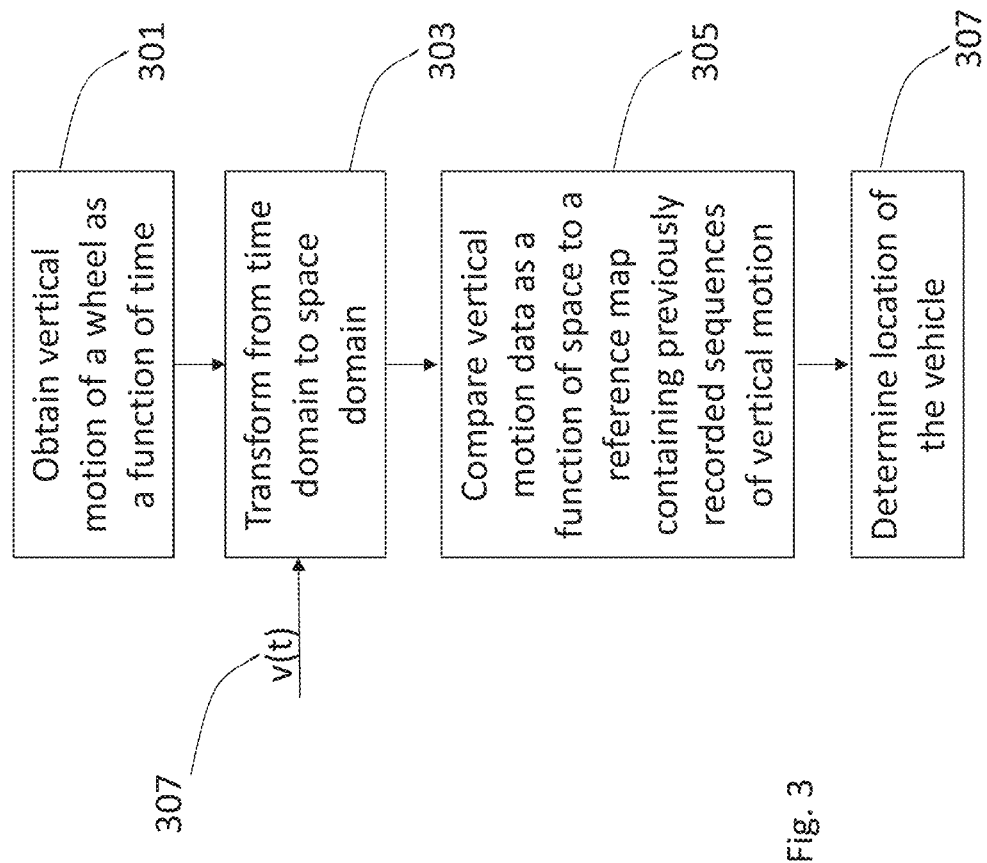
FIG. 3 depicts a flow chart of an exemplary method for terrain-based localization.

FIG. 3 illustrates a flow chart of an exemplary process that may be utilized to localize a vehicle. In a first step 301, sequences of vertical motion of one or more wheels as a function of time is collected by one or more motion sensors as described herein and may be fed into a controller. Further, the operating speed of the vehicle, denoted v(t) 307, may also be detected and supplied to the controller. In certain embodiments, the operating speed of the car may be detected using one or more of the same motion sensors that are used for detecting vertical acceleration of the wheel; in other embodiments, the speed of the car may be detected using a different motion sensor (e.g., by using the on-board speedometer of the vehicle). In a second step 303, the operating speed of the vehicle may be utilized to transform the vertical motion from the time domain into the space domain. In a third step 305, the determined sequences of vertical motion in the space domain may be compared to reference sequences of vertical motion that are contained in a reference map. Various pattern matching methods may be utilized to correlate the observed data to the reference data in order to determine a location of the vehicle 307. In certain embodiments, particle filters may be utilized to match observed vertical velocity, vertical acceleration and/or vertical displacement of one or more wheels to reference sequences of vertical velocity, vertical acceleration, and/or vertical displacement contained in the reference map. The location of the vehicle may then be communicated either directly or indirectly to other vehicle controllers (such as, e.g., an autonomous driving controller or an active suspension controller)

Figure 4:
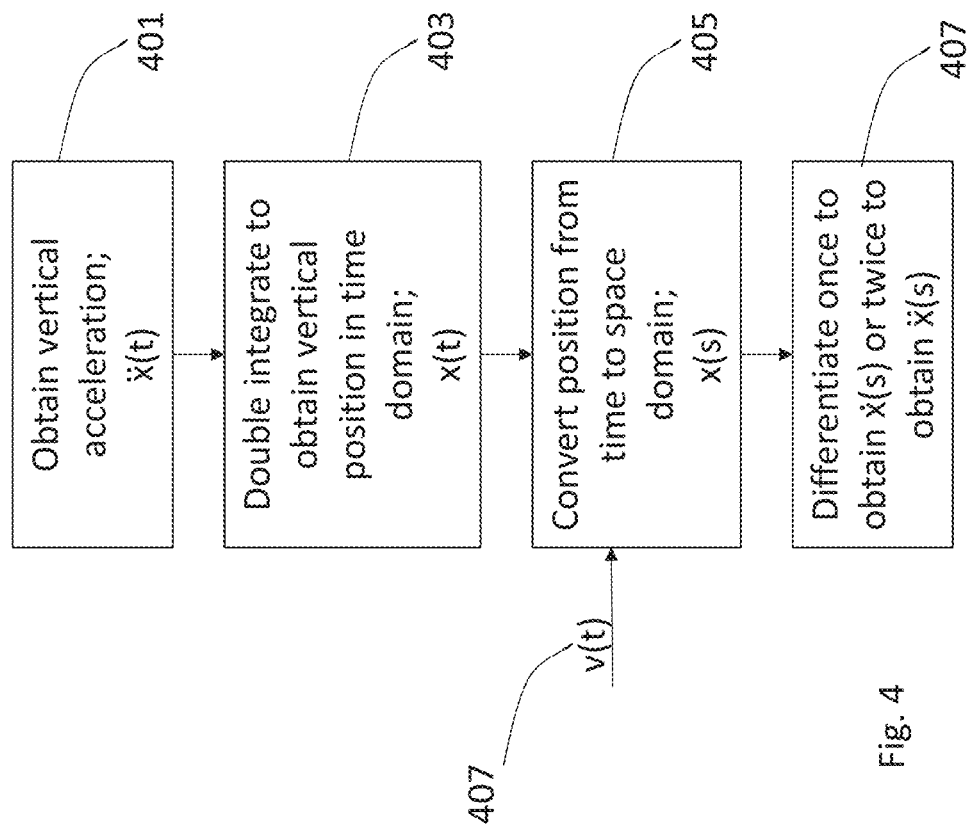
FIG. 4 depicts a flow chart of an exemplary method for transforming vertical motion data from a time domain to a distance domain.

FIG. 4 illustrates a flow chart of an exemplary process that may be utilized to convert sequences of vertical acceleration data in the time domain (denoted $\ddot{x}(t)$) to sequences of vertical acceleration in the space domain (denoted $\ddot{x}(s)$). In a first step 401, a sequence of vertical accelerations in the time domain is collected by one or more accelerometers attached to a wheel or wheel assembly, as discussed above. In a second step 403, the acceleration sequence may be doubly integrated with respect to time to yield a sequence of vertical positions of the wheel or wheel assembly with respect to time (denoted x(t)). Optionally, a high pass filter may be applied after each integration in order to remove noise associated with drift of the accelerometers. In a third step 405, the detected operating speed of the vehicle, v(t) 407, may be utilized to convert the sequence of vertical positions from the time domain to the space domain (denoted x(s)). In certain embodiments, the observed sequence of vertical position in the space domain may be compared to a reference map containing a sequence of reference vertical positions. However, the inventors have recognized that, in certain use cases, the accuracy of the localization may be improved by, in a fourth step 407, differentiating the vertical position sequence x(s) a single time in order to obtain a sequence of vertical velocity as a function of space (denoted $\dot{x}(s)$). Alternatively, the position function may be differentiated twice in order to obtain a sequence of vertical acceleration as a function of space (denoted $\ddot{x}(s)$). In certain embodiments, the sequence of vertical velocities in the space domain, $\dot{x}(s)$, may then be compared to a reference map containing sequences of reference vertical velocities in order to locate the vehicle. Alternatively, in certain embodiments, the sequence of vertical accelerations in the space domain may be compared to a reference map containing sequences of reference vertical accelerations to locate the vehicle.

In certain embodiments, it may be desirable to apply for example, a low pass filter to the vertical motion data (e.g., the sequence of vertical acceleration, velocity, or position), so that conditions that may result in, for example, high frequency motion of a wheel are partially or fully ignored for localization. Such conditions that may result in high frequency motion of the wheel may include, for example, driving over a piece of debris (e.g.; a branch) in the road, driving over a pothole in the road, etc. The inventors have recognized that these conditions may be prone to change—for example, the piece of debris may move or be removed from the road, the pothole may be repaired, etc. —such that in certain embodiments it may be undesirable to consider high frequency motion for localization. Conditions that may result in lower frequency motion of a wheel (such as, for example, driving up or down a hill) are less likely to undergo frequent changes. In certain embodiments, therefore, a low pass filter may be applied to the vertical motion data following transformation to the space domain. In certain embodiments, the low pass filter at least partially attenuates motion at frequencies higher than a first threshold, while allowing motion at frequencies lower than the first threshold to pass unattenuated or effectively unattenuated. In various embodiments, the first threshold may be approximately 0.1 cycles per meter, 0.3 cycles per meter, 0.5 cycles per meter, or 1 cycle per meter. Alternatively or additionally, in certain embodiments a low pass filter may be carried out on motion data while it is still in the time domain (e.g., before transformation into the space domain (see FIG. 1)). In these embodiments, the first threshold is in units of hertz (e.g., cycles per time) and, in various embodiments, may be 5 Hz, 1 Hz, 0.5 Hz, or 0.3 Hz.

Alternatively, instead of discarding high frequency vertical motion data, such high frequency motion may be utilized to improve precision or accuracy. For example, in a two lane road, the right lane may include a known pothole while the left lane does not. If high frequency vertical motion of one or more of the vehicle's wheels indicate that the vehicle's wheel traversed the pothole, then it can be concluded that the vehicle is travelling in the right lane. In certain embodiments, therefore, both low frequency motion data and/or high frequency motion data may be utilized to locate the vehicle. In certain embodiments, low frequency vertical motion data (e.g., low-pass filtered data) may be used to first obtain an approximate location of the vehicle (e.g., to identify a particular road or section of road in which the vehicle is travelling), and high frequency vertical motion data (e.g., high-pass filtered data) may subsequently be used to refine the approximate location (e.g., to identify a particular lane in which the vehicle is travelling).

In certain embodiments, the vertical motion data used for localization may correspond to the vertical motion (e.g., acceleration, velocity, change in vertical position) of only one wheel. In other embodiments, the vertical motion data used for localization may correspond to motion of two wheels, three wheels, four wheels, or a number of available wheels of the vehicle. In certain embodiments, a difference in motion between a first set of one or more wheels of the vehicle and a second set of one or more wheels of the vehicle may be calculated. For example, in a four-wheeled vehicle, "road pitch" is understood to describe the difference in vertical position between the front wheels of the vehicle and the back wheels of the vehicle, while "road roll" is understood to describe the difference in vertical position between the left wheels of the vehicle and the right wheels of the vehicle. It is understood that the terms "roll" and "pitch," as used herein, may refer to either (a) road roll and road pitch, respectively, or (b) vehicle body roll and vehicle body pitch, respectively. In certain embodiments, vertical motion data used for localization may include road pitch, road pitch velocity (i.e., the rate of change of road pitch), road pitch acceleration (i.e., the rate of change of road pitch velocity), road roll, road roll velocity, and/or road roll acceleration as a function of space. Particularly, inventors have found that localization based on road pitch acceleration or velocity and/or road roll acceleration or velocity allow for repeatable and accurate localization. Without wishing to be bound by theory, it is contemplated that the differentiation used to convert from road pitch to road pitch velocity or acceleration and/or the differentiation used to convert from road roll to road roll velocity or acceleration effectively serves as a high pass filter that operates to filter out drift errors that may be exacerbated due to previous integration steps.

Figure 5:
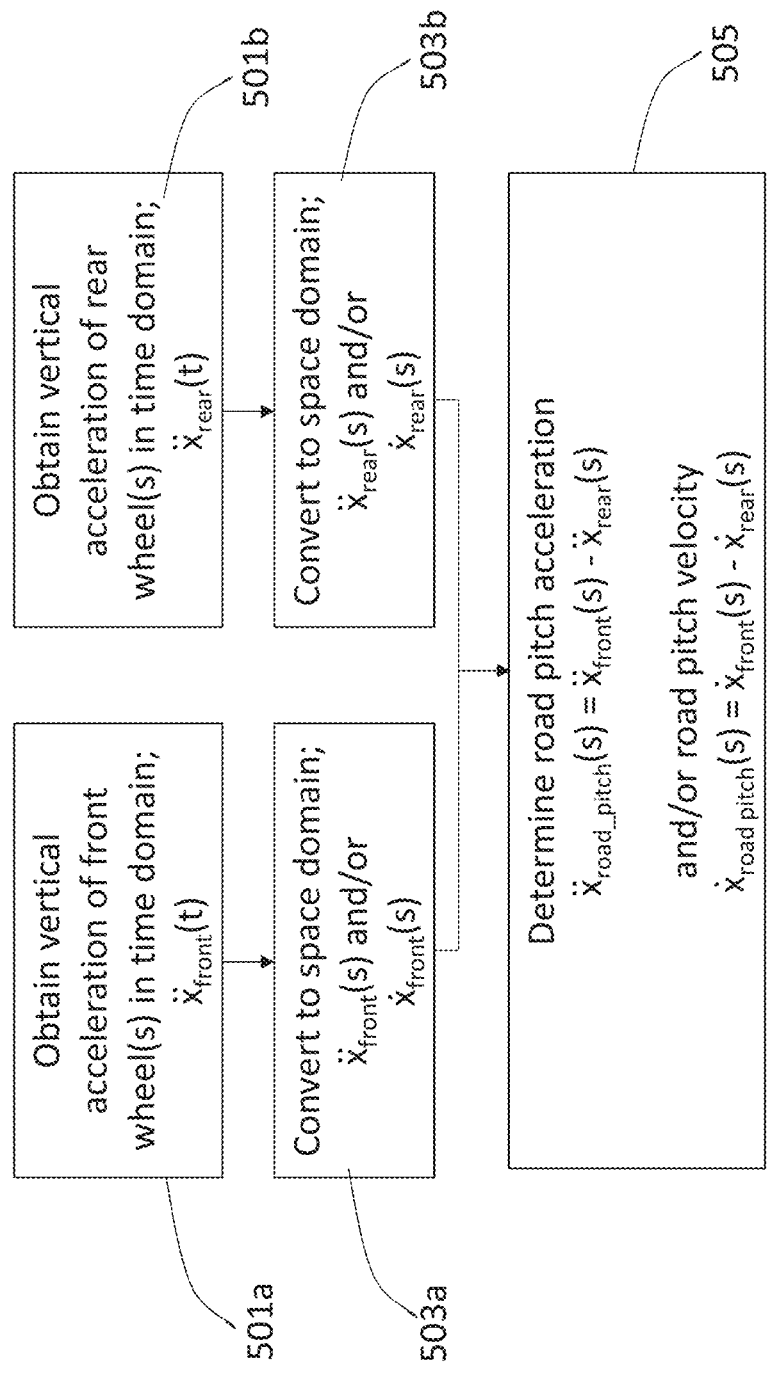
FIG. 5 depicts a flow chart of an exemplary method for determining road pitch data.
Figure 6:
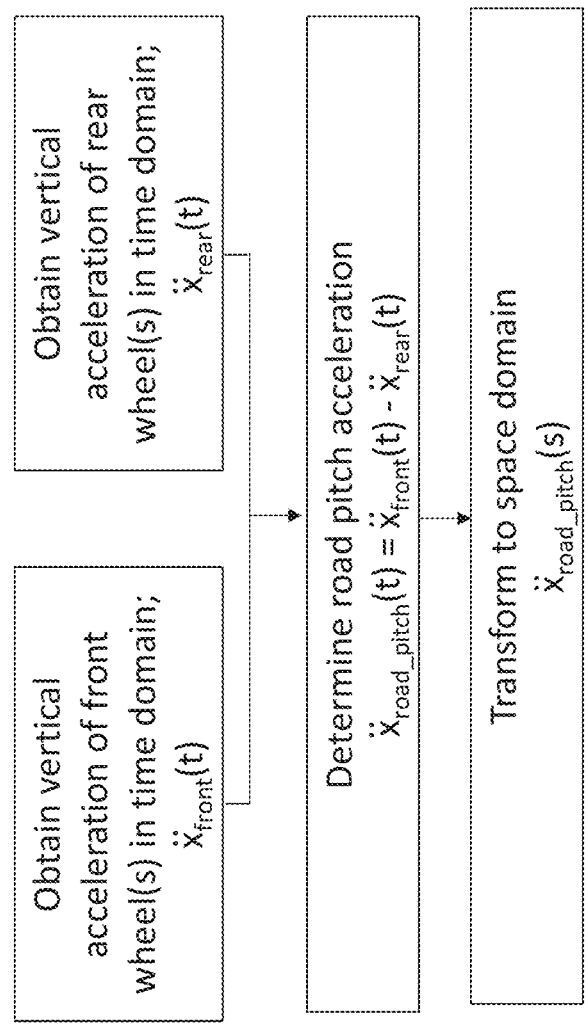
FIG. 6 depicts a flow chart of an exemplary method for determining road pitch data.

FIG. 5 illustrates an exemplary method for determining road pitch velocity or acceleration. In a first step 501a, a set of one or more accelerometers may be utilized to detect sequences of vertical acceleration, in a time domain, of one or more front wheels of a vehicle. In a second step 503a, the sequence of vertical accelerations of the front wheel(s) in the time domain may be transformed into the space domain, to yield either vertical velocity of the front wheel(s) in the space domain and/or vertical acceleration of the front wheels in the space domain. Simultaneously, a second set of one or more accelerometers may be utilized to detect sequences of vertical acceleration, in a time domain, of one or more rear wheels of the vehicle 501b. The sequence of vertical accelerations of the rear wheel(s) in the time domain may be transformed into the space domain, to yield either vertical velocity of the rear wheel(s) in the space domain and/or vertical acceleration of the rear wheel(s) in the space domain 503b. In a third step 505, the difference in vertical velocity between the front wheels and rear wheels in the space domain may be evaluated to identify road pitch velocity in the time domain. Likewise, the difference in vertical acceleration between the front wheels and rear wheels in the space domain may be evaluated in order to identify road pitch acceleration in the time domain. Alternatively, as shown in FIG. 6, the road pitch acceleration and/or velocity may be determined in the time domain (e.g., by evaluating a difference between vertical acceleration of at least one front wheel and at least one rear wheel in the time domain), and subsequently transformed to the space domain.

As would be recognized by one of ordinary skill in the art, the roll and/or pitch (along with roll velocity, pitch velocity, roll acceleration, and pitch acceleration) experienced by the vehicle as it traverses a typically uneven surface depends on the vehicle's wheel base (i.e., the distance between the centers of the front and rear wheels) and axle track (i.e., the difference between the centers of the right wheels of the vehicle and the left wheels of the vehicle). For example, a reference map generated by a first car traversing a road surface at a known location and obtaining reference pitch and/or reference roll data. However, the reference motion data may not accurately describe the pitch and/or roll motion that is experienced when a second car traverses the same road surface, if the second car has a different wheel base and/or axle track from the first car. Therefore, in certain embodiments, the vertical motion data (e.g., the sequence of vertical motion in the space domain) obtained for a given vehicle may be adjusted based on wheel base and/or axle track of the vehicle in order to match vertical motion data collected with a reference vehicle having a different wheel base and/or axle track. In this way, the localization may be based, at least partially, on the sensed vertical motion of one or more wheels of the vehicle, the operating speed of the vehicle, and the wheel base and/or axle track of the vehicle.

An embodiment of a vehicle localization system for carrying out the aforementioned localization method may comprise one or more localization controllers having at least one input and at least one output. In certain embodiments, one or more motion sensors attached to one or more wheels of the vehicle may be configured to sense sequences of vertical motion of the one or more wheels, and to communicate the sequences of vertical motion to the input(s) of the one or more localization controllers. In certain embodiments, the vehicle's speedometer is configured to communicate the vehicle's operating speed to the input(s) of the one or more localization controllers. In certain embodiments, communication from the speedometer to the one or more localization controllers may occur via the vehicle's CAN bus. The one or more localization controllers may carry out various transformations, filtering, pattern matching, and/or other data processing steps as described in text and figures herein. In certain embodiments, the vehicle localization system may include a non-transitory computer memory that stores one or more reference maps. The localization controller may be capable of, or configured to, access the computer memory. The one or more reference maps may contain reference data for a plurality of corresponding road segments. In certain embodiments, this reference data may correspond to surface data (e.g., elevation of various road surfaces, angles of banking of various road surfaces, sloping of various road surfaces), and a model may be used to dynamically convert the stored surface data into reference vertical motion data that describes the vertical motion expected for a given vehicle. In certain embodiments, the reference data may correspond to reference vertical motion data (e.g., reference pitch, roll, and/or heave positions; reference pitch, roll and/or heave velocities; reference pitch, roll, and or heave accelerations). In certain embodiments, the reference vertical motion data may be collected by traversing the plurality of road segments with a reference vehicle and recording the vertical motion of one or more (e.g., one, two, or four) wheels of the reference vehicle. In certain embodiments, the computer memory may be remotely located and the localization system may include a wireless network interface through which the controller and memory are configured to communicate.

In certain embodiments, the localization controller may be configured to determine a vehicle location based at least partially on (a) the detected vertical motion data, (b) the operating speed of the vehicle, and (c) the reference data contained in the one or more reference maps. In certain embodiments, the controller may be configured to determine the vehicle location based at least partially on the wheel base and/or axle track of the vehicle, as described above. In certain embodiments, the localization controller may be configured to communicate the vehicle location to other devices (e.g., other controllers) in the vehicle, for example via the at least one output of the controller. Such communication may be wireless or wired, encrypted or unencrypted.

In addition to, or instead of, obtaining a sequence of vertical motion via an accelerometer attached to a portion of an unsprung mass of a vehicle (e.g., the wheel), such data may be obtained by one or more motion sensors (e.g., an IMU, an accelerometer) built into a mobile computing device (e.g., a cell phone, a tablet, a laptop) that is removably located within the vehicle. For example, many cell phones feature accelerometers and/or IMUs that are capable of detecting sequences of motion of the cell phone. In certain embodiments, the mobile computing device may be removably mounted inside the vehicle, for example, attached to a vehicle with a cell phone mount, and held in a known orientation relative to the vehicle. In certain embodiments, the mobile computing device may be programmed to detect sequences of motion of the mobile computing device, and to communicate the information to a controller. In certain embodiments, the controller is part of the mobile computing device (e.g., it may be the main processor of the exemplary cell phone). In other embodiments, the controller is part of the vehicle. In yet other embodiments, the controller may be remotely located and communication may occur wirelessly. In certain embodiments, the controller may be configured to obtain vertical motion data by filtering, transforming, and/or otherwise processing the detected sequences of motion as described elsewhere in this disclosure. In certain embodiments, reference vertical motion data may be generated based on recorded road characteristics (e.g., road profiles) that may be, for example, contained in a reference map. The obtained vertical motion data may be compared with the reference vertical motion data in order to determine a location of the vehicle.

In certain embodiments, the vehicle localization system may include a global positioning system (GPS). Using methods known in the arts, the GPS may be used to identify a candidate set of road segments. However, due to limitations in accuracy and resolution, the GPS may sufficiently narrow the actual location of the vehicle to one specific road segment of the candidate set of road segments. In certain embodiments, a non-transitory computer memory stores a reference map that includes reference vertical motion data corresponding to each road segment of the candidate set of road segments. In certain embodiments, at least one motion sensor configured to sense vertical motion of one or more of the wheels of the vehicle may be used to obtain sequences of vertical motion (e.g., roll, pitch, heave, roll velocity, heave velocity, pitch velocity, roll acceleration, heave acceleration, pitch acceleration). The obtained sequences of vertical motion may be filtered, transformed (e.g., from time to space domain), and/or processed as described herein to obtain vertical motion data, and the obtained vertical motion data may be compared to the reference vertical motion data that corresponds to each road segment of the candidate set of road segments. Based on the comparison of the obtained vertical motion data and the reference vertical motion data, a specific road segment from the candidate set of road segments may be identified as the actual location of the vehicle.

In certain embodiments, a particle filter may be used to match observed vertical motion data of a vehicle to reference vertical motion data contained within a reference map. In certain embodiments, a first localization system (e.g., GPS) may be utilized to first determine a range of possible locations of a vehicle, and a particle filter may subsequently be utilized to determine a precise location of the vehicle within the range of possible locations.

Figure 11:
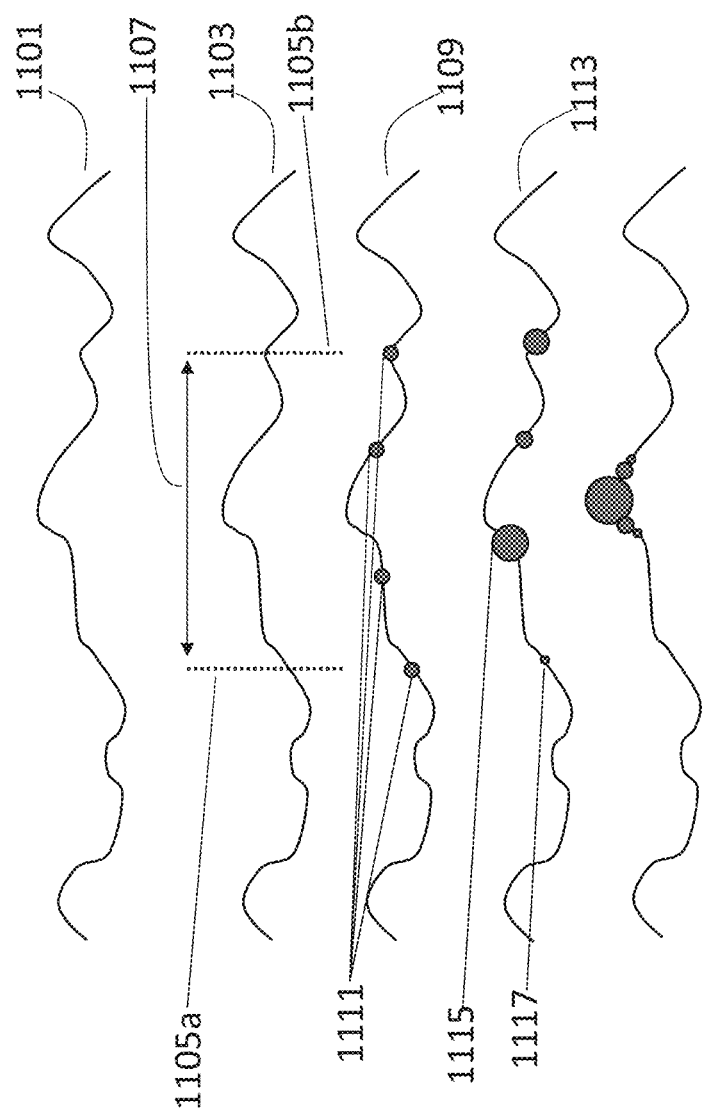
FIG. 11 illustrates utilizing a particle filter for localization of a vehicle.

FIG. 11 illustrates an exemplary method of localizing a vehicle by use of a particle filter. A road profile 1101 associated with a given road section, or plurality of road sections, may be contained in a reference map that is stored in a computer memory. This road profile 1101 may be generated based on previous traversal of the road section either by the same vehicle or by one or more different vehicles. In various embodiments, the road profile 1101 may represent the vertical elevation of a road surface along the road section, or the road profile may be expressed as vertical motion (e.g., vertical wheel velocity, vertical wheel acceleration) that is experienced by a wheel or vehicle body that traverses the road section.

In a first step 1103, a first localization system (e.g. a GPS) of a vehicle may be used to determine a range 1107 of possible locations for the vehicle, as shown by the dotted lines 1105a-b. For example, the range 1107 of possible locations of the vehicle may be reported as being within a given radius of a certain absolute location (e.g., within a 1 km radius of given latitude/longitude pair), or the range 1107 may be reported as being within a certain subsection of a road (e.g., between mile marker 19 and mile marker 20 on a given freeway). Based on the first localization system, therefore, it can be known that the vehicle is located somewhere within this range 1107 of possible locations, but the exact location may not be obtained using only the first localization system.

In a second step 1109, a controller generates a plurality of virtual "particles" 1111 that may be distributed uniformly along the range of possible locations. Each virtual particle may be assigned a weight, represented visually for means of explanation by the radius of each virtual particle. Initially, the weight assigned to each virtual particle 1111 may be equal. An operating speed and/or direction of the vehicle may be measured, and each virtual particle may be considered as travelling along the road profile, at various starting points, at approximately the same speed and/or direction as the vehicle. Vertical motion data (e.g., vertical elevation, vertical velocity, or vertical acceleration) of one or more wheels of the vehicle may be collected during operation of the vehicle. After a given amount of time has passed, the road profile theoretically observed by each virtual particle may be compared to the actual vertical motion data collected during operation of the vehicle. In the next step 1113, the weight of each virtual point (as illustrated by the radius) may be modified based on a correlation between the (theoretical) road profile observed by each virtual particle and the actual vertical motion data collected during operation of the vehicle. For example, a first virtual particle 1115 that travels along a road profile that substantially correlates to the actual vertical motion data collected by the vehicle may be assigned a weight that is larger than a second virtual particle 1117 that travels along a road profile that diverges substantially from the actual vertical motion data collected by the vehicle. Particles with weights lower than a certain threshold may be removed (that is, such particles may no longer be considered a possible location of the vehicle). Particles with weights larger than a certain threshold may be divided into multiple virtual particles, each travelling at slightly different speeds or with slightly different positions. The comparison and weighting steps may be repeated a number of times such that, eventually, the weighted density of particles may be largest at a point that represents the actual location of the vehicle. Therefore, by evaluating the weights and numbers of particles, the actual location of the vehicle within the initial range of possible locations may be identified.

In certain embodiments, a confidence rating may be determined that indicates a level of confidence that the location determined by the localization system corresponds to an actual location of the vehicle. For example, a high confidence rating may indicate that the determined location very likely describes the actual location of the vehicle with high accuracy, while a low confidence rating may indicate that the determined location less likely describes the actual location, or that the determined location is likely to be less accurate. Once a specific road segment of a candidate set of road sequences is determined as being the location of a vehicle (e.g., using the methods described above), reference vertical motion data for the road segment immediately previous to the specific road segment may be compared with obtained vertical motion data previously collected by the vehicle. If the previously collected vertical motion data also matches the reference vertical motion data for the previous road segment, then the confidence rating may be increased to a higher level from the existing level. This process may be repeated by then comparing reference vertical motion data for a further previous road segment (e.g., two segments behind the specific road segment) with previously collected vertical motion data, and so on.

For example, a road may comprise sequential segments labelled A, B, C, D, and E. The localization controller may determine that a vehicle is currently located on segment "D" using, for example, the localization methods described above. The localization controller would then look to the previous road segment, "C", and compare reference vertical motion data associated with road segment "C" to vertical motion data previously collected by the vehicle. If there is a match, the localization controller may then repeat the process by comparing reference vertical motion data associated with road segment "B" to vertical motion previously collected by the vehicle, and so on. A confidence rating may then be determined based on the number of sequential road segments (which may or may not be abutting segments) for which reference vertical motion data corresponds to collected vertical motion data of the vehicle. This confidence rating may be displayed to a driver and/or passenger in the car, for example via an indicator in the dashboard or console or a heads-up display (HUD). This confidence rating may be communicated to other devices in the car. Further, the function of various vehicular components (e.g., actuators in an active suspension system) and/or various parameters affecting the vehicle's operation may be varied based at least partially on the determined confidence rating. Alternatively or additionally, the localization information gathered by a vehicle may be compared to localization information collected by one or more other vehicles. The relative positioning information determined in this manner may be compared with relative positioning information determined by other means such as, for example, radar, acoustic, and optical ranging systems.

In certain embodiments, surface features may be intentionally added to a portion of a road surface in order to assist with localization based on vertical motion of a vehicle or a portion thereof. For example, a series of small bumps and/or indentations having known amplitudes may be intentionally placed on a road surface at a known location. These intentionally located surface features may serve as a type of fiducial marker, providing a known fingerprint that can be detected by one or more motion sensors of the vehicle (e.g., by an accelerometer attached to a portion of an unsprung mass of the vehicle). As an example, such fiducial markings (e.g., bumps, indentations) may be placed on, or built into, a road surface at a known location. The known location may be inside a tunnel, an underground parking lot, or at another location where GPS is similarly prone to failure. When one or more wheels of a vehicle undergo a sequence of vertical motions that can be attributed to the fiducial markings, the vehicle's location may be precisely determined as correlating to the known location of the fiducial markings. In certain embodiments, the fiducial markings may be sufficiently small such that they are imperceptible or effectively imperceptible to a driver and/or passenger located within the vehicle when the vehicle traverses the markings. In certain embodiments, the fiducial markings may be part of a surface of a manhole cover.

Further, the inventors have recognized that one or more motion sensors configured to detect vertical motion of a vehicle and/or vehicle component (e.g., a wheel of the vehicle) may be additionally or alternatively utilized to identify and diagnose the emergence of defects in a road surface. Road surfaces may, over time, develop defects. Types of defects include cracks, potholes, corrugations, swelling, etc. For an organization responsible for maintaining road surfaces, such as a municipality, it may be important to identify surface defects before such defects are sufficiently large enough to cause damage to a vehicle utilizing the road surface.

In light of the above, the inventors have recognized the benefit of an automated system for detecting surface defects. In certain embodiments, one or more motion sensors (e.g., accelerometers) attached to a vehicle (e.g., to a portion of an unsprung mass of the vehicle) may be used to identify, measure, and/or track the growth of a defect on a road surface. In certain embodiments, a vehicle may include one or more (e.g., at least one, at least two, at least three, at least four) motion sensors (e.g., accelerometers), wherein each motion sensor is configured to sense vertical motion of a portion of the unsprung mass of the vehicle. In certain embodiments, each motion sensor may be attached to a wheel or wheel assembly of the vehicle. In certain embodiments, the motion sensor may be configured to detect a sequence of vertical motions of a portion of the vehicle as it traverses a road surface. In certain embodiments, the detected sequence may be communicated (e.g., via a communication interface) to a suspension controller. In certain embodiments, a dimension (e.g., a depth of a crack or pothole, a width of a crack, etc.) of a surface defect traversed by the vehicle may be determined based at least partially on the detected sequence of vertical motions, a weight of the unsprung mass or a portion thereof, an operating speed of the vehicle, or any permutation or combination thereof.

In certain embodiments, the determined dimension of the surface defect may be compared with a previously determined dimension of the same surface defect in order to measure a rate of change of the dimension of the defect. In certain embodiments, upon determination that (a) the dimension of the surface defect exceeds a threshold value and/or (b) the rate of change of the dimension of the surface defect exceeds a certain value (e.g. indicating that the defect is growing), a location of the surface defect may be flagged, communicated to other vehicles (such that other vehicles may, for example, avoid the defect by rerouting) and/or communicated to an organization charged with maintaining the road surface.

In certain embodiments, a non-transitory computer memory may store a map including road segments along with corresponding vertical motion data representing sequences of vertical motions experienced by one or more (e.g., one, a plurality of) vehicles traversing each road segment. In certain embodiments, a reference sequence of vertical motion may be obtained by recording vertical motion of a portion (e.g., a body, a wheel, a plurality of wheels) of a reference vehicle traversing a known defect of a known type and/or known size. In certain embodiments, a surface defect located on a specific road segment contained in the map may be identified and/or classified (e.g., by type and/or by size) by comparing the vertical motion data stored in the map to the reference sequence of vertical motion.

In certain embodiments, a vehicle may include at least one backwards looking sensor (e.g., a backwards and/or downwards looking camera) that is capable of obtaining images of a portion of a road surface after or during when the vehicle traverses the portion of the road surface. In certain embodiments, in response to vertical motion of the vehicle or a portion thereof exceeding a threshold acceleration and/or threshold velocity, the backwards looking camera may obtain and store an image and/or video of the corresponding road surface that resulted in the vertical motion (e.g., the vertical motion may trigger, after an optional delay, a capture of the image and/or video by the backwards looking sensor). The stored image and/or video may be stored in non-transitory computer memory. The stored image and/or video may be used, for example, to classify or confirm a type and/or size of a defect or object responsible for the vertical motion. For example, in cases when damage occurs due to the vertical motion of the vehicle or the portion thereof (e.g., driving through a pothole large enough to damage a wheel hub), the stored image and/or video may also be useful for insurance claims and/or related legal proceedings.

In certain embodiments, a vehicle may include one or more forward looking sensors (e.g., a forward looking camera, a LIDAR sensor) capable of detecting characteristics of a portion of a road surface before the vehicle encounters the portion of the road surface. These sensors may become misaligned or miscalibrated due to, for example, collisions, weather, or other events. In certain embodiments, calibration of one or more forward looking sensors may be checked and/or corrected by comparing vertical motion experienced by a vehicle or a portion thereof with data collected from the one or more forward looking sensors. For example, the forward looking sensor may be used to identify and predict the size of an obstacle (e.g., a depression (e.g., a pothole), an extrusion (e.g., a bump, an object)) in a road surface ahead of the vehicle. Based on the type and/or size of the obstacle, a predicted response of the vehicle or the portion thereof may be determined (e.g., by a controller). The predicted response may represent predicted vertical motion (e.g., vertical displacement, velocity, acceleration) of the vehicle or the portion thereof. In certain embodiments, the actual response experienced by the vehicle when it traverses the obstacle may be observed and compared with the predicted response. In certain embodiments, the actual response may correspond to vertical motion experienced by the vehicle or the portion thereof (e.g., as measured by one or more motion sensors). In certain embodiments, if the actual response is substantially different from the predicted response, it may be determined that the forward looking sensor is, for example, miscalibrated and/or misaligned. In certain embodiments, upon determination that the forward looking sensor is miscalibrated and/or misaligned, a visual indicator may be activated to alert a vehicle operator and/or passenger. In certain embodiments, the forward looking sensor may be re-aligned, and the process may be repeated until the predicted response is substantially similar to the actual response.

In another aspect, a vehicle is disclosed that comprises a plurality of localization systems, each of which is capable of determining a location of the vehicle. For example, a vehicle may include any of the following localization systems: GPS, terrain-based localization (as described herein), LIDAR-based localization, road surface penetrating radar localization, visual landmark-based localization, WiFi source mapping, etc. In general, these localization systems may operate by collecting samples, and comparing the collected samples to reference data taken at known locations. The rate at which data is collected is known as a "sampling rate." For example, a landmark based localization system that uses a camera to obtain two images each second for comparison with reference images may be said to have a sampling rate of 2 samples per second (or 2 Hz).

In certain embodiments, a vehicle may comprise a first localization system and a second localization system. The first localization system may have a first sampling rate and first resolution and the second localization system may have a second sampling rate and second resolution, where the sampling rates and/or resolutions of two localization systems may be different. In certain embodiments, the second sampling rate may be higher than the first sampling rate (e.g., the second localization system may be configured to collect more samples in a given time period than the first localization system). In certain embodiments, the first resolution may be higher than the second resolution. The inventors have recognized that, under a first set of driving conditions, the first localization system may be capable of more accurate localization than the second localization system while, under a second set of driving conditions, the second localization system may be capable of more accurate localization than the first localization system. For example, sufficiently low operating speeds of a vehicle may favor the first localization system having the first resolution and first sampling rate. However, as operating speed of the vehicle increases, accuracy of the first localization system may decrease due to its sampling rate, and the second localization system may become more accurate.

In light of the above, in certain embodiments the vehicle includes a localization controller configured to communicate with the first localization system and the second localization system. In certain embodiments, the localization controller may receive a first location from the first localization system and a second location from the second localization system, and may determine the vehicle's location based on the first and/or second location. In certain embodiments, the localization controller may determine the vehicle's location based on a weighted average of the first location and second location, whereby a first weight and second weight are assigned to the first location and the second location, respectively. For example, a first weight of 1 for the first location and a second weight of 0 for the second location may indicate that only the first location is considered, and the second location discarded; a first weight of 0.5 for the first location and a second weight of 0.5 for the second location may indicate that the first location and second location are considered equally; a first weight of 0.33 for the first location and a second weight of 0.66 for the second location may indicate that the second location is given twice as much weighting as the first location. In certain embodiments, the controller may determine the first weight and second weight based on an operating condition (e.g., speed) of the vehicle.

For example, when the vehicle is operated at a speed equal or greater than a threshold speed, the controller may assign a second weight to the second determination that is larger than the first weight assigned to the first determination; when the vehicle is operated at a speed less than the threshold speed, the controller may assign a second weight to the second location that is less than the first weight assigned to the first location. In some embodiments, the first weight and second weight may be determined based on weather conditions. In conditions with good visibility (e.g., day time, clear day, no rain or snow), for example, the first location may be assigned a higher weight than the second location, while under conditions with poor visibility (e.g., night-time, snow or rain, clouds), the second location may be assigned a higher weight than the first location. In some embodiments, the first weight and second weight may be determined based on characteristics of the location surrounding the vehicle or the ground surface across which the vehicle traverses. For example, for urban driving (e.g. paved roads, tall buildings), the first location may be assigned a higher weight than the second location, while for sub-urban or rural driving (e.g., unpaved roads, sparse buildings) the second weight may be assigned a higher weight than the first location.

In various embodiments, the first localization system may include a LIDAR localization system, landmark-based localization system, a WiFi source mapping system, GPS, vertical motion localization system (as described herein), ground-penetrating radar localization system, or any other localization system as known in the art. In various embodiments, the second localization system may include LIDAR localization system, landmark-based localization system, a WiFi source mapping localization system, GPS, vertical motion localization system (as described herein), ground-penetrating radar localization system, or any other localization system as known in the art.

In certain embodiments, more than two localization systems may be utilized and dynamically weighted based on an operating parameter and/or environmental parameter, as described above. In certain embodiments, a vehicle may comprise a plurality of localization systems, each of which is configured to determine a location of the vehicle. Based at least in part on an operating parameter (e.g., operating speed) and/or environmental parameter (e.g., light conditions, visibility, weather, etc.), each location as determined by each respective localization system of the plurality may be dynamically assigned a weight. Based on the assigned weights and the respective locations (e.g., by taking a weighted average), a specific location of the vehicle may be determined. In certain embodiments, for certain operating parameters and/or environmental parameters, the weight assigned to one or more of the plurality of localization systems may be zero (indicating that the location(s) determined by the one or more localization systems is not considered). In certain embodiments, for certain operating parameters and/or environmental parameters, at least one of the plurality of localization systems may be disabled.

In certain embodiments, a first vehicle may comprise a first localization system. The first localization system may be configured to determine a first location of the first vehicle, and may, for example, be any of the previously mentioned localization systems. The first location may be communicated from the first vehicle to a second vehicle. For example, the first vehicle may comprise a first communications interface (e.g., a first wireless transmitter) configured to exchange data with a second communications interface (e.g., a second wireless transmitter) that is located in the second vehicle. The second vehicle may also include a sensor that is configured to determine a relative distance between, or relative position of, the second vehicle with respect to the first vehicle. For example, the first vehicle may generate a set of one or more signals (e.g., a magnetic signal, an acoustic signal, a radio frequency signal, a light signal etc.), and the second vehicle may have a set of one or more sensors (e.g., magnetic field sensor, audio sensor, an RF receiver, light detector) capable of receiving at least one signal of the set of signals. Based on, for example, the amplitude of each signal as received by the second vehicle compared to the amplitude of each signal as transmitted by the first vehicle, a relative distance between, or relative position of, the first vehicle with respect to the second vehicle may be determined. Using the first location of the first vehicle and the relative distance or relative position of the second vehicle with respect to the first vehicle, a second location of the second vehicle may be determined.

In another aspect, a vehicle may include an active suspension system that controls a suspension system of the vehicle based at least in part on the location of the vehicle (e.g., as determined by a localization system). An "active" suspension system refers to vehicular suspension systems in which one or more actuators are interposed between the unsprung mass of a vehicle, which generally includes the vehicle's wheels and wheel assembly, and the sprung mass of the vehicle, which generally includes the vehicle's body. Active suspension systems utilizing electrohydraulic actuators, for example, are described in U.S. patent application Ser. No. 14/602,463 filed Jan. 22, 2015, which is herein incorporated by reference in its entirety.

One advantage of an active suspension system, when compared to a passive suspension system, is that the one or more actuators of the active suspension system may be used to at least partially decouple vertical motion of the vehicle's wheels from vertical motion of the vehicle body. For example, in a passive suspension system, when a vehicle's wheel traverses a pothole, the wheel may move downward into the pothole, thereby resulting in downward motion (e.g., downward acceleration) of the vehicle body. This downward acceleration of the vehicle body may be felt by the driver and/or passengers present within the vehicle body, possibly contributing to a loss in ride comfort and satisfaction. In an active suspension system, on the other hand, when a vehicle's wheel traverses a pothole, the one or more actuators may be used to increase the separation distance of the vehicle body, such that vertical position of the vehicle body remains constant, substantially constant, or effectively constant. In other words, as the wheel moves downwards to traverse the pothole, the vehicle body may be raised relative to the wheel, such that the vehicle body retains a constant or substantially constant vertical position. Likewise, when a vehicle's wheel traverses a bump, the one or more actuators of an active suspension system may be used to lower the vehicle body relative to the wheels such that, despite upwards motion of the wheel, the vertical position of the vehicle body may remain constant, substantially constant, or effectively constant. As a result, an active suspension system may offer drivers and/or passengers the potential for a more comfortable ride.

Due to inherent size and packaging limitations, the amount that a vehicle body may be lowered or raised relative to the vehicle's wheels by the active suspension system may be limited by a stroke length of the one or more actuators of the active suspension system. As illustrated in FIG. 7, the sprung mass 701 of the vehicle, which includes a vehicle body, may be supported by the spring 703. FIG. 7 shows the actuator 707 at its nominal length (length "L") which occurs when the vehicle is on a horizontal road surface and is not accelerating. In order to raise the sprung mass 701 relative to the unsprung mass 705 (e.g., to raise the vehicle body relative to the wheel), the actuator 707 may apply an active upwards force (i.e. a force in the direction of motion) on the sprung mass 701 thereby raising the sprung mass 701 relative to the unsprung mass 705 (i.e., thereby increasing the vertical separation distance between the sprung mass and the unsprung mass).

As shown in FIG. 8, when the sprung mass sufficiently raised relative to the unsprung mass, the actuator reaches a maximum length (denoted "$L_{max}$") which defines a maximum separation distance between the sprung mass and unsprung mass (i.e., a maximum height of the sprung mass relative to the unsprung mass). Once the actuator reaches its maximum length, the vehicle body (which is part of the sprung mass), cannot be further raised relative to the wheel (which is part of the unsprung mass). In exemplary electrohydraulic actuators, the maximum length may occur when the actuator housing 730 physically contacts an extension end-stop 732 (also referred to as a bump-stop) that is attached to the piston rod, such that the extension end-stop precludes further extension of the actuator. For this reason, an actuator reaching its maximum length may be referred to as an "end-stop event."

Alternatively, in order to lower the vehicle body relative to the wheel (i.e., to decrease the separation distance between the vehicle body and wheel), the actuator may apply a downward active force on the sprung mass. As shown in FIG. 9, when the sprung mass is sufficiently lowered relative to the unsprung mass, the actuator reaches a minimum length (denoted "$L_{min}$"). Once the actuator reaches its minimum length, the vehicle body cannot be lowered further relative to the wheel. In electrohydraulic actuators, the minimum length may occur when the actuator housing 730 contacts a compression end-stop 740 (alternatively referred to as a bump-stop) so that the actuator cannot be compressed any further. For this reason, an actuator reaching its minimum length may also be referred to as an "end-stop event." End-stop events may be encountered in a passive suspension system, a semi-active suspension systems, or in an active suspension system, as well.

At any given time, excluding during an end-stop event, an active suspension system actuator has a current length that falls in the range between its minimum length and its maximum length. The available extension at a given time refers to the difference in the maximum length minus the current length of the actuator at the given time. The current length of an actuator at any given time may be equal to the neutral length of the actuator (i.e., the length of the actuator when it applies no active force), or the current length of an actuator at any given time may be different from the neutral length (e.g., such as when the actuator is applying an active force to raise and/or lower the sprung mass). The available compression at a given time refers to the difference in the current length at the given time minus the minimum length. For example, if the current length of an actuator at a given time is 12 inches, and the maximum length of the actuator is 18 inches, then the available extension at the given time is 6 inches (indicating that the sprung mass may be raised, with respect to the unsprung mass, by a maximum of 6 inches relative to its current position). Likewise, if the current length of an actuator at a given time is 12 inches, and the minimum length of the actuator is 4 inches, then the available compression at the given time is 8 inches (indicating that the sprung mass may be lowered, with respect to the unsprung mass, by a maximum of 8 inches relative to its current position).

As discussed previously, when a vehicle traverses an obstacle, an active suspension system may be used to decouple vertical motion of the vehicle body from vertical motion of the vehicle's wheels by, for example, raising the vehicle body relative to a wheel when the vehicle traverses a pothole and lowering the vehicle body relative to one or more wheels when the vehicle traverses a bump. However, if a dimension of the obstacle (e.g., a height of a bump, or a depth of a pothole) exceeds the available extension (for an extrusion such as a bump) or available compression (for a pothole), then it may not be possible to retain a constant vertical position of the vehicle body. For example, if an actuator at a given time has an available compression of 6 inches, and the vehicle travels over a bump that has a height of 10 inches, the actuator may compress until it reaches its minimum length (e.g., until an end-stop event occurs). Once the actuator reaches its minimum length, it is no longer possible to further lower the vehicle body relative to the wheel, and further vertical motion of the wheel necessarily results in some vertical motion of the vehicle body. Likewise, if an actuator at a given time has an available extension of 6 inches, and the vehicle travels over a pothole that has a depth of 10 inches, the actuator may extend until it reaches its maximum length (e.g., until an end-stop event occurs). Once the actuator reaches its maximum length, it is no longer possible to further raise the vehicle body relative to the wheel, and further vertical motion of the wheel necessarily results in some vertical motion of the vehicle body.

In light of the above, the inventors have recognized that, in order to prepare for traversal of an obstacle that is sufficiently large to cause an end-stop event, it may be advantageous to dynamically adjust the current length of an actuator in anticipation of the vehicle encountering the obstacle (e.g., the length of an active-suspension actuator may be adjusted prior to the associated wheel of the vehicle encountering the obstacle), thereby a priori increasing either the available extension or available compression of the actuator before the vehicle encounters the obstacle. For example, the current length of an actuator at a given time may be 12 inches and the maximum length of the actuator may be 18 inches. If the vehicle traverses a pothole having a depth of 7 inches, an end-stop event may occur as described above since the depth of the pothole exceeds the available extension of the actuator. Such an end-stop event may be avoided if, before encountering the pothole, at least the actuator associated with the wheel that will enter the pothole is compressed to increase the available extension of the actuator (e.g., such that the available extension exceeds the depth of the pothole at the time of encounter). For example, prior to encountering the pothole, the actuator may be compressed to a current length of 10 inches, such that the available extension of the actuator becomes 8 inches (exceeding the depth of the pothole). Likewise, when anticipating an event such as an extrusion, that may result in compression of the actuator (e.g., a bump or other object extending from a surface) sufficient to cause an end-stop event, the actuator may be extended prior to the vehicle encountering the extrusion, such that the available compression of the actuator is increased (e.g., such that the available compression exceeds the height of the bump at the time of encounter). "Encountering" an obstacle refers to the time at which any of the vehicle's wheels come into physical contact with a portion of an obstacle. The specific actuator lengths mentioned above are exemplary and not intended to limit the disclosure.

Figure 10:
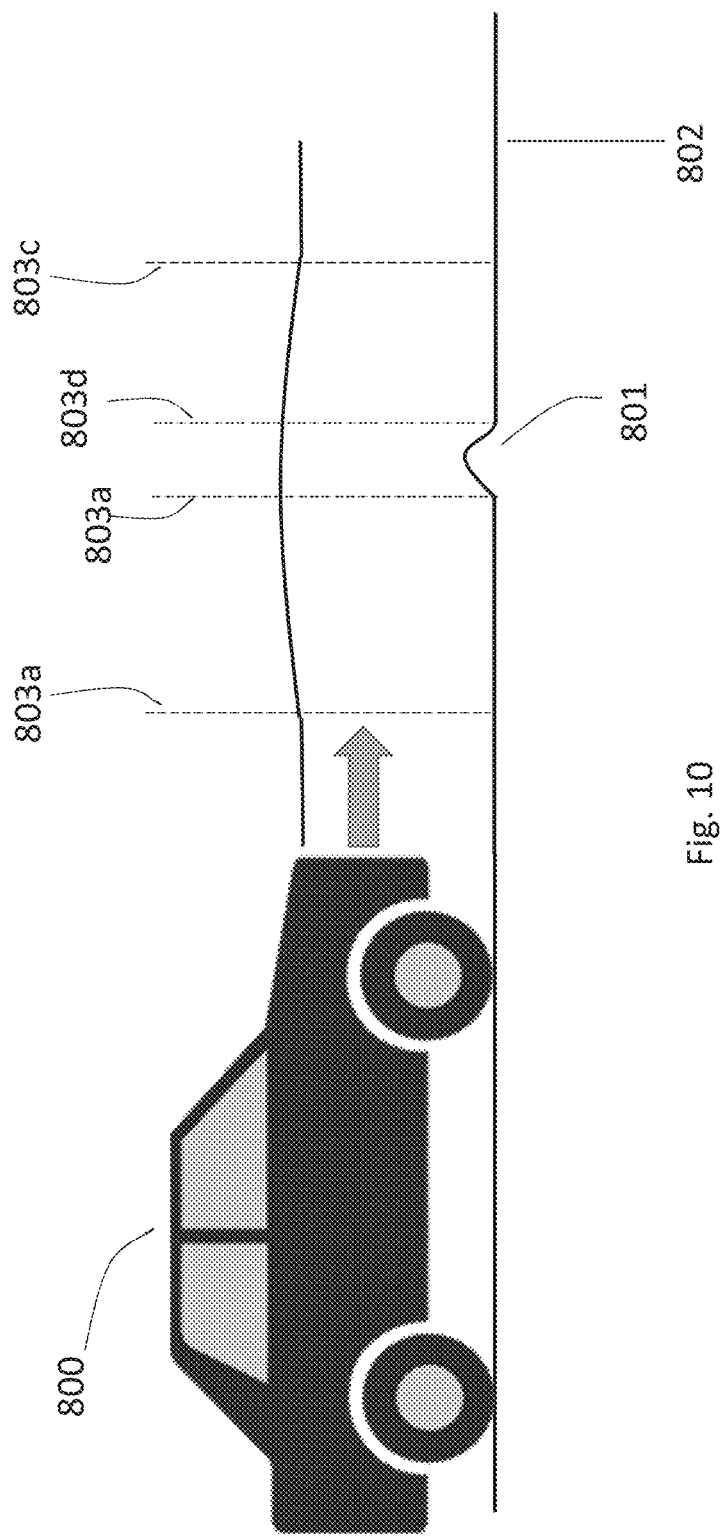
FIG. 10 illustrates an exemplary vehicle traversing an extrusion in a road surface.

Adjusting the current length of an actuator of a vehicle's active suspension system prior to the vehicle encountering an obstacle thereby imparts vertical motion into the vehicle body, which may be felt by the vehicle's driver and/or passengers. The current length of the actuator may be changed gradually, over some period of time prior to encountering the obstacle, such that instantaneous acceleration or velocity of vertical motion of the vehicle body remains at levels substantially less than if the vehicle were to undergo an end-stop event upon traversal of the obstacle. That is, instead of a driver and/or passenger of the vehicle perceiving the obstacle as a sudden, severe occurrence which may include an end-stop event, the vertical motion of the vehicle body may be distributed over a longer period of time (or distance) such that driver and/or passenger may perceive a more gradual, less severe occurrence. FIG. 10 illustrates a vehicle 800 approaching discontinuity 801 (e.g. a bump) in the road 802. In certain embodiments, a length of one or more actuators (for example those located in the front of the vehicle) may be adjusted at, for example, a first point 803*a*, before one or both front wheels arrive at the discontinuity at point 803*b*. The length of one or more actuators located in the rear of the vehicle may be adjusted at a second subsequent point in time (not shown). The actuators may be controlled to gradually return to their nominal length "L" at point 803*c* rather immediately after the end of the discontinuity at point 803*d*. This may provide an occupant of the vehicle with a perception that the vehicle body is gradually ascending or descending. This gradual process may begin a before the front and or the rear wheels encounter the obstacle.

In certain embodiments, a first vehicle may include one or more sensors that detect when one or more actuators of an active suspension system of the first vehicle experience an end-stop event at a first time. A location of the end-stop event, as well as the type of end-stop event (e.g., whether the actuator reaches maximum length or minimum length) may be recorded and stored in a non-transitory computer memory. In certain embodiments, one or more sensors may be utilized to detect and record a location and type of a near end-stop event. A near end-stop event is understood to refer to an event that causes a length of an actuator of an active suspension system to reach a value not less than a first threshold of its maximum length or not greater than a second threshold of its minimum length. In certain embodiments, the first threshold may be 60%, 75%, 80%, 85%, 90%, or 95%. In certain embodiments, the second threshold may be 130%, 120%, 115%, 110%, or 105%.

When a second vehicle subsequently approaches the recorded location of the end-stop event or near end-stop event, a current length of one or more actuators of an active suspension system of the second vehicle may be adjusted (e.g., the length of the one or more actuators may be increased or decreased, thereby raising or lowering the height of the second vehicle's body relative to the second vehicle's wheels in anticipation of an end stop event) prior to the second vehicle reaching the recorded location. In certain embodiments, the length of the one or more actuators may be adjusted such that, upon subsequent traversal of the recorded location by the second vehicle, an end-stop event or near end stop-event may be avoided. In certain embodiments, the second vehicle may be the same as the first vehicle. In certain embodiments, the second vehicle may be different from the first vehicle.

In certain embodiments, the computer memory may store a plurality of recorded locations at which previous end-stop events were detected, as well as a type for each end-stop event. In certain embodiments, the computer memory storing recorded locations of end-stop events may also be accessible to a plurality of vehicles. In certain embodiments, the recorded location of an end-stop event experienced by one vehicle may be communicated to other vehicles directly. In certain embodiments, the computer memory may store a first location of an end-stop event experienced by a first vehicle and a second location of an end-stop event experienced by a second vehicle, different from the first vehicle. This way, if one car experiences an end-stop event, then a different vehicle travelling over the same location or obstacle may be able to prepare for the event prior to reaching the location or encountering the obstacle. In certain embodiments, the computer memory may be located remotely. In certain embodiments, the first and/or second vehicle may include a network interface that allows the first and/or second vehicle to wirelessly communicate with the remotely located computer memory. Note that in certain embodiments, if the first and second vehicle are different, the maximum length of the actuator of the second vehicle compared to the maximum length of the actuator of the first vehicle may be considered. Likewise, the minimum length of the actuator of the second vehicle compared to the minimum length of the actuator of the first vehicle may also be considered.

In certain embodiments, a vehicle may include at least one forward looking sensor, such as for example, a LIDAR sensor, SONAR sensor, RADAR sensor, or visual camera. The at least one forward looking sensor may detect the presence and characteristics of an obstacle (e.g., a bump, a pothole, a foreign object on the road surface) before the obstacle is encountered by the vehicle. The at least one forward looking sensor may communicate with a suspension controller. The suspension controller may use data received from the at least one forward looking sensor to determine, measure, or predict a dimension (e.g., a height, a depth) of the obstacle.

Alternatively or additionally, the suspension controller may have access to a non-transitory computer memory storing a three-dimensional map that includes surface data (e.g., locations and dimensions of bumps, potholes, elevation changes in road surface, etc.). In certain embodiments, based on a current location of a vehicle and a direction of travel of the vehicle, the suspension controller, or another controller in communication with the suspension controller, may determine, by evaluating the surface data from the three-dimensional map, that the vehicle is likely to traverse an object (e.g., a depression, an extrusion) having a dimension (e.g., a depth, a height) sufficient to cause an end-stop event or a near end-stop event. Alternatively or additionally, the vehicle may include an interface for receiving a destination from a user, and may plan a route from a starting location or current location to the destination point. In certain embodiments, the vehicle may evaluate the three dimensional map to identify an object (e.g., a depression or extrusion in the road surface) that is located on the planned route and that has a dimension (e.g., a depth, a height) that may cause an end-stop event or a near end-stop event.

By comparing a measured, predicted or prerecorded dimension of an obstacle to the available compression or available extension at a given time, the suspension controller may determine whether traversing the obstacle is likely to cause an end-stop event or a near end-stop event. If the suspension controller determines that an end-stop or near end-stop event is likely (e.g., if the controller determines that the available compression or available extension at the given time is less than the dimension of the obstacle), then the suspension controller may adjust the length of one or more actuators of an active suspension system of the vehicle in order to increase the available compression or available extension such that, after being adjusted, the available compression or available extension is not less than the determined or predicted dimension of the obstacle.

In certain applications, a vehicle may traverse an obstacle (e.g., a surface depression, an extrusion) during a turn or other maneuver. While a vehicle is conducting a turn, the length of an actuator of an active suspension system of the vehicle may be varied, for example, due to roll effects or compensation thereof. In certain embodiments, one or more controllers may predict (a) a time point at which the vehicle is expected to encounter the obstacle; and (b) an expected length of the actuator at the time point (e.g., by accounting for roll effects that may be caused by turning or other maneuvers). The controller may then adjust the current length of the actuator a priori such that the available extension or available compression of the actuator at the time point at which the vehicle is expected to encounter the obstacle is not less than a depth of the surface depression (e.g., pothole) or not less than a height of the extrusion (e.g., a bump), respectively.

In certain embodiments, an actuator may utilize end-stop control in order to preclude the occurrence of end-stop events. For example, an actuator may be configured such that, once the actuator reaches a length no less than a first threshold of its maximum length, a first force is applied to a piston of the actuator in order to inhibit or prevent the actuator from reaching its maximum length. Additionally or alternatively, in certain embodiments, an actuator may be configured such that, once the actuator reaches a length less than a second threshold of its minimum length, a second force is applied to the piston of the actuator in order to inhibit or prevent the actuator from reaching its minimum length. In certain embodiments, the first threshold may be 60%, 75%, 80%, 85%, 90%, or 95%. In certain embodiments, the second threshold may be 130%, 120%, 115%, 110%, or 105%. Various parameters of end-stop control include, for example, piston positions or actuator length thresholds at which the first force and/or second force are applied; and a relationship of a magnitude of the first force and/or second force as a function of the length of the actuator or position of the piston.

While such end-stop inhibition may preclude the occurrence physical damage, it also may decrease the effective available compression and/or available extension of the actuator. If a dimension of an obstacle is known before being encountered by a vehicle, then it may be possible to implement an active suspension system response strategy (e.g. pre-compressing or pre-extending an actuator) so that the object may be traversed by the vehicle without an end-stop event. The parameters of end-stop prevention control may be adjusted based on a comparison of the actual response relative to a predicted response.

For example, as discussed previously, when a vehicle having a hydraulic actuator traverses an extrusion (e.g., a bump) in a road surface, the actuator may be pre-compressed in length. If a height of a bump ahead of the vehicle is known, then—in combination with various vehicle parameters (optionally including stiffness of one or more suspension components (e.g., air-springs), damping coefficient of one or more suspension damping coefficients, operating speed of the vehicle)—an amount of expected compression resulting from traversal of the bump can be predicted. If the expected compression is less than the available compression (such that an end-stop event is not possible or is not likely to occur), then end-stop prevention control may be disabled, such that no inhibiting force is actively applied. If the expected compression is effectively the same as, or greater than, the available compression (such that an end-stop event is possible or even likely), then end-stop control having appropriate parameters may be implemented.

"Vertical motion" as used herein refers to motion (e.g., motion of a corner of a car body, motion of a wheel of a car) in a direction normal to or effectively normal to a portion of the ground surface that is in contact with the wheel of the vehicle. Vertical motion may include, for example, vertical velocity, vertical acceleration, or vertical displacement of an object. "Vertical motion data" as used herein refers to data that represents, or is derived from, a sequence of vertical motions of an object or set of connected objects. Vertical motion data may include, for example, data representing sequences of heave, pitch, roll, heave velocity, pitch velocity, roll velocity, heave acceleration, pitch acceleration, or roll acceleration as a function of time or space. "Motion sensor" as used herein refers to any sensor or set of sensors configured to sense an object's acceleration or a measure from which an object's acceleration may be derived, an object's velocity or a measure from which an object's velocity may be derived, and/or a change in position of an object or a measure from which an object's change in position may be derived. "Operating velocity" or "operating speed" refers to the speed or velocity at which a vehicle traverses a ground surface. "Controller" refers to electronic circuitry comprising a processor, at least one input for receiving an input signal, and at least one output for transmitting an output signal, wherein the output signal is determined based, at least in part, on the input signal.

What is claimed is:

1. A method for determining a location of a vehicle, the method comprising:
   determining, by a first localization system of a mobile computing device, a first location of a vehicle, wherein the mobile computing device is removably mounted within a vehicle, and wherein the mobile computing device includes the first localization system and one or more motion sensors, wherein the mobile computing device is selected from a group consisting of a cell phone, a tablet, and a laptop;
   identifying, based on the first location, a candidate set of road segments;
   sensing, via the one or more motion sensors, sequences of motion of the mobile computing device to obtain vertical motion data;
   accessing at least one computer memory storing reference vertical motion data for a plurality of road segments;
   comparing the obtained vertical motion data to the stored reference vertical motion data;
   based at least partially on the comparison, identifying a specific road segment of the candidate set of road segments.

2. The method of claim 1, wherein the mobile computing device is a cell-phone, and wherein the first localization system is a GPS.

3. The method of claim 1, wherein the mobile computing device is a cell phone that is attached to the vehicle with a cell phone mount.

4. The method of claim 1, wherein
   the mobile computing device is programmed to communicate information about the sequences of motion to a controller, wherein
   the controller is configured to determine the location of the vehicle based on the sequences of motion.

5. The method of claim 4, wherein
   the controller is located in a location selected from the group consisting of the vehicle and a remote location.

6. An apparatus for determining a location of a vehicle, comprising:
   a mobile computing device, selected from a group consisting of a cell phone, a tablet, and a laptop, removably located in the vehicle, wherein the mobile computing device is configured to estimate a location of the vehicle based on GPS measurements, and to measure a vertical motion of the vehicle, with a sensor selected from the group consisting of an accelerometer and an IMU;
   a controller configured to determine the location of the vehicle based on the GPS measurements and the vertical motion of the vehicle.

7. The apparatus of claim 6, wherein the controller is in the vehicle.

8. The apparatus of claim 6, wherein the mobile computing device is a cell phone that is attached to the vehicle with a cell phone mount.

* * * * *